United States Patent
Pettit

(12) 
(10) Patent No.: US 11,002,698 B2
(45) Date of Patent: May 11, 2021

(54) SYSTEM FOR THERMALLY INFLUENCING A CRACK TIP OF CRACK WITHIN A SPECIMEN AND RELATED METHODS

(71) Applicant: FractureLab, LLC, Fruit Heights, UT (US)

(72) Inventor: Richard Pettit, Fruit Heights, UT (US)

(73) Assignee: FractureLab, LLC, Fruit Heights, UT (US)

(*) Notice: Subject to any disclaimer, the term of this patent is extended or adjusted under 35 U.S.C. 154(b) by 145 days.

(21) Appl. No.: 16/157,859

(22) Filed: Oct. 11, 2018

(65) Prior Publication Data
US 2020/0116660 A1    Apr. 16, 2020

(51) Int. Cl.
*G01N 29/24*    (2006.01)
*G01N 29/04*    (2006.01)
(Continued)

(52) U.S. Cl.
CPC .............. *G01N 25/72* (2013.01); *G01N 3/38* (2013.01); *G01N 21/88* (2013.01); *G01N 25/12* (2013.01);
(Continued)

(58) Field of Classification Search
CPC ........... G01N 2203/0062; G01N 21/88; G01N 2203/0066; G01N 25/13; G01N 25/72; G01N 29/06; G01N 3/38; G01N 3/60; G01N 3/066; G01N 2203/027; G01N 2203/0073; G01N 2203/0617; H02J 50/40; H02M 7/219; H02M 2001/009; H02M 2001/0083
See application file for complete search history.

(56) References Cited

U.S. PATENT DOCUMENTS

| 4,003,246 A * | 1/1977 | Cain | G01N 3/32 73/799 |
| 5,351,026 A * | 9/1994 | Kanbara | H01C 1/034 338/22 R |

(Continued)

OTHER PUBLICATIONS

Wikipedia, Partial discharge definition, https://en.wikipedia.org/wiki/Partial_discharge, retrieved from the web Oct. 11, 2018, 7 pages.

(Continued)

*Primary Examiner* — Brandi N Hopkins
(74) *Attorney, Agent, or Firm* — TraskBritt

(57) ABSTRACT

A testing system for causing a physical change in a crack tip region of a crack within a specimen. The testing system includes a load application system for applying a load to the specimen having the crack formed therein, an electrothermal system for applying an electrical current through the specimen and comprising a power supply and a controller operably coupled to the load application system and the electrothermal system. The load application system configured to perform a crack growth test on the specimen. A method of thermally influencing a crack tip region of a crack within a specimen includes applying at least one pulse of current to the specimen to generate flux tangentially around the crack within the specimen and at the crack tip region and causing the crack tip region of the crack within the specimen to reach a predetermined activation temperature.

24 Claims, 10 Drawing Sheets

(51) Int. Cl.
    *G01N 29/14* (2006.01)
    *G01N 25/72* (2006.01)
    *G01N 3/38* (2006.01)
    *G01N 25/12* (2006.01)
    *G01N 29/06* (2006.01)
    *G01N 21/88* (2006.01)
(52) U.S. Cl.
    CPC ..... *G01N 29/06* (2013.01); *G01N 2203/0062* (2013.01)

(56) References Cited

U.S. PATENT DOCUMENTS

| 8,544,338 B2 | 10/2013 | Pettit | |
| 2006/0137466 A1* | 6/2006 | Wright, III | G01N 3/066 73/808 |
| 2012/0292505 A1* | 11/2012 | Damiano | H01J 37/20 250/307 |

OTHER PUBLICATIONS

Source of Magnetic Fields, Chapter 9, 9.1-9.13.13, http://web.mit.edu/viz/EM/visualizations/coursenotes/modules/guide09.pdf, 69 pages.
P. Kumar et al., Electromagnetic jigsaw: metal-cutting by combining electromagnetic and mechanical Forces, SciVerse ScienceDirect, 2013, pp. 600-604, Elsevier B.V.
Norio Hasebe, Magneto-elastic stress in a thin infinite plate with an elliptical hole under uniform magnetic field, Received: Dec. 7, 2009 / Accepted: May 25, 2010 / Published online: Jun. 15, 2010, 81: 745-764, Springer-Verlag.
Norio Hasebe, Heat Conduction and Thermal Stress Analyses of a Strip with Semi-Elliptical Notch Under Electric Current, Journal of Thermal Stresses, 2010, 33: 135-158, Taylor & Francis Group, LLC.
NDT Resource Center, Acoustic Emission Testing, Equipment, https://www.nde-ed.org/EducationResources/CommunityCollege/Other%20Methods/AE/AE_Equipment.php, visited Oct. 11, 2018, 3 pages.
Melanie Hamilton, Thermal Oxidation of Titanium for Improved Medical Implant Osseointegration, Power Point Presentation, University of Illinois at Chicago College of Dentistry, 17 pages.
Griffin et al. The Influence of Electric Current on Crack Propagation in Thermal Fatigue Tests, USAF Report AFOSR-TR-86-0886, 1986, 129 pages.
Digital Wave Corporation, Modal Acoustic Emission (MAE), https://www.digitalwavecorp.com/copy-of-modal-acoustic-emission-1, visited Oct. 11, 2018, 2 pages.
ASTM International, Standard Test Method for Measurement of Fatigue Crack Growth Rates, ASTM E647-15e1, (2010), pp. 689-733.
Liu et al., "Material Property and Stress Field near Notch Tip in Steel Plate under High Electric Current,"MATEC of Conferences, vol. 151, 01004 (2018), 4 pages.
Liu et al., "Numerical Analysis of Joule Heating Behavior and Residual Compressive Stress Around Crack Tip Under High Electric Load," Hindawi Modelling and Simulation in Engineering, vol. 2017, Article ID 3012949, 8 pages.
Liu et al., "Numerical and Experimental Studies of Electro-Thermal Machining for Melting Notch Tip in Steel Strip," CIRP, vol. 42, (2016), pp. 679-684.
Liu, "Effects of Temperature-Dependent Material Properties on Stress and Temperature in Cracked Metal Plate Under Electric Current Load," International Journal of Mechanical and Mechatronics Engineering, vol. 4, No. 5, (2010), pp. 418-423.
Liu, "Finite Element Analysis of Crack Welding Process," International Journal of Mechanical and Mechatronics Engineering, vol. 8, No. 1, (2014), pp. 23-26.
Liu, "Finite Element Modeling of Melting Crack Tip Under Thermo-Electric Joule Heating," Engineering Fracture Mechanics, vol. 78, (2011), pp. 666-684.
Qin et al., "Joule Heating and Its Implications on Crack Detection/Arrest in Electrically Conductive Circular Cylindrical Shells," Journal of Thermal Stresses, vol. 30, (2007), pp. 623-637.
Satapathy et al., "Crack Tip Behavior Under Pulsed Electromagnetic Loading," IEEE Trans. On Magnetics, vol. 41, No. 1, (Jan. 2005), pp. 226-230.

* cited by examiner

SYSTEM FOR THERMALLY INFLUENCING A CRACK TIP OF CRACK WITHIN A SPECIMEN AND RELATED METHODS

FIELD

This disclosure relates to systems and methods for thermally influencing (e.g., thermally processing) a crack tip of a crack within a specimen (e.g., a body of electrically conductive material).

BACKGROUND

Thermal heating of a crack tip of a crack within a specimen utilizing electrical current has been studied by J. Griffin and S Cunningham (*The Influence of Electric Current on Crack Propagation in Thermal Fatigue Tests*, USAF Report AFOSR-TR-86-0886, 1986) in the context of thermal mechanical fatigue testing, where the specimen is heated using induction heating. In the foregoing study, testing was performed to determine whether induced current, interacting with cracks forming in the specimen, influenced a crack growth rate of the crack and whether the induced current introduced undesirable artifact into the test data. Others have similarly studied mathematics of potential flow of electrical current around a crack tip of a crack to quantify a potential drop (i.e., an amount of potential energy per unit charge) in the specimen as electrical current flows around a crack tip. A change in potential drop associated with the growth of the crack is conventionally measured and used to estimate the crack length and a propagation rate of the crack. The potential drop method is described in conventional test standards such as, for example, ASTM E647.

As is known in the art, electrical current flow around a crack tip of a crack within a specimen, applied simultaneously with an externally applied magnetic field oriented substantially parallel to a crack front of the crack, can create Lorentz forces (i.e., body forces local to the crack tip of the crack that can act to open the crack) depending on the orientation of the electrical current flow and the externally applied magnetic field. The foregoing process has been proposed in the art to grow a crack, and thus, cut a sheet of conductive material with an action conventionally described as an electromagnetic jigsaw. See Kumar et al., *Electromagnetic Jigsaw: Metal-Cutting by Combining Electromagnetic and Mechanical Forces*, Procedia CIRP, Vol. 6, 2013, pp. 600-604). As is known in the art, a mechanical force is combined with Lorentz forces, which enables an operator to direct a crack propagation along a predetermined path.

BRIEF SUMMARY

Some embodiments of the present disclosure include a testing system for causing a physical change in a crack tip region of a crack within a specimen. The testing system may include a load application system for applying a load to the specimen having the crack formed therein, an electrothermal system for applying an electrical current through the specimen and comprising a power supply, and a controller operably coupled to the load application system and the electrothermal system. The load application system is configured to perform a crack growth test on the specimen.

Further embodiments of the present disclosure include a method of thermally influencing a crack tip region of a crack within a specimen. The method may include applying at least one pulse of current to the specimen to generate flux tangentially around the crack within the specimen and at the crack tip region and causing the crack tip region of the crack within the specimen to reach a predetermined activation temperature. The thermally influenced region may also be configured to be removable for further examination or use.

Additional embodiments of the present disclosure include a method of thermally influencing a crack tip region of a crack within a specimen. The method may include subjecting the specimen to one or more loads within a portion of a crack growth test; pausing the crack growth test, applying at least one pulse of current to the specimen to generate flux tangentially around the crack within the specimen and at the crack tip region, causing the crack tip region of the crack within the specimen to reach a predetermined activation temperature, and subjecting the specimen to one or more additional loads within another portion of the crack growth test.

DETAILED DESCRIPTION

Figure 1A:
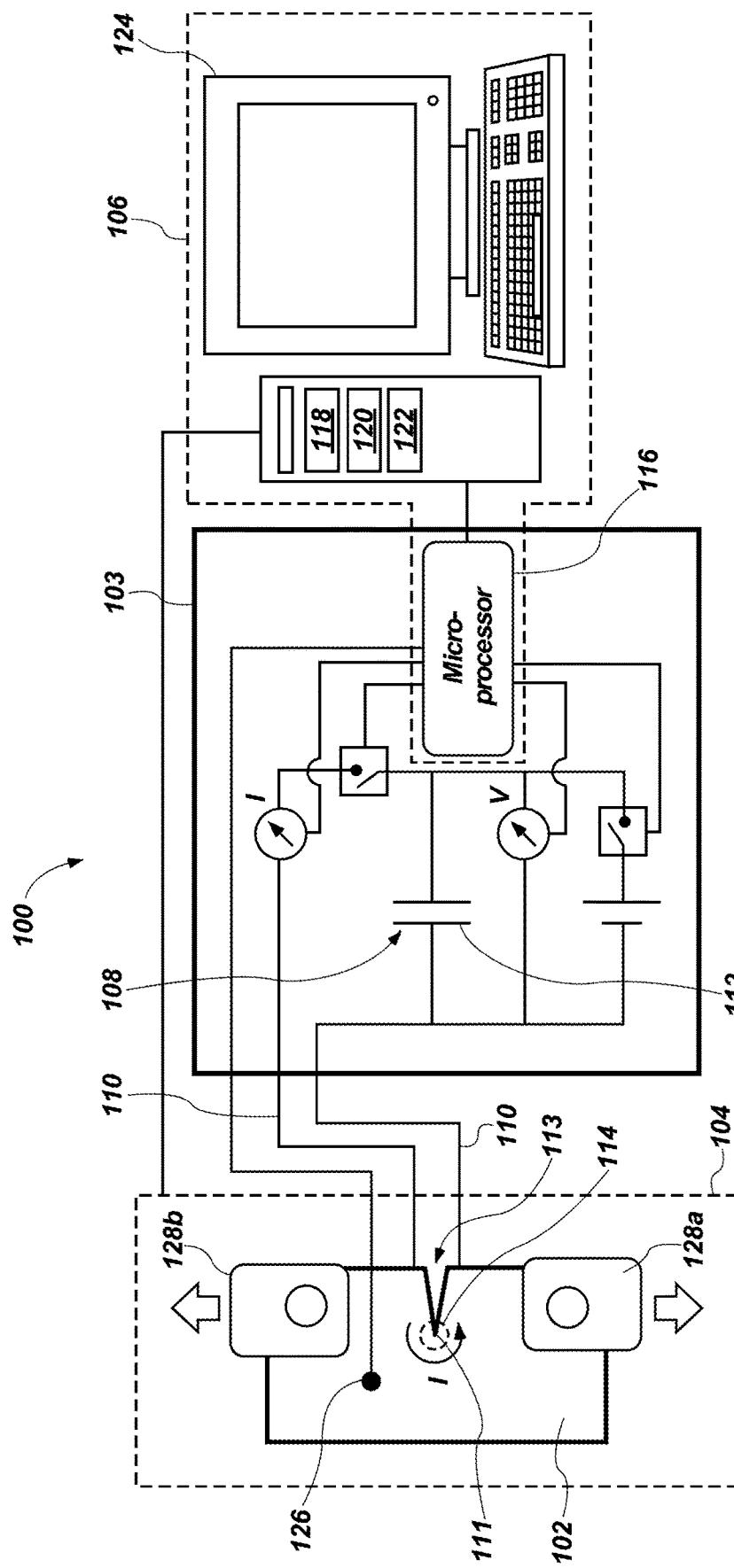
FIG. 1A is a simplified schematic diagram of a testing system for thermally effectuating (i.e., causing) a response or change in a specimen according to one or more embodiments of the present disclosure.

The illustrations presented herein are not actual views of any particular device or method, but are merely idealized representations employed to describe example embodiments of the present disclosure. The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, any drawings accompanying the application are for illustrative purposes only, and are thus not drawn to scale. Additionally, elements common between figures may have corresponding numerical designations.

As used herein, the terms "comprising," "including," "containing," "characterized by," and grammatical equivalents thereof are inclusive or open-ended terms that do not exclude additional, un-recited elements or method steps, but also include the more restrictive terms "consisting of," "consisting essentially of," and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

As used herein, the term "crack" refers to a gap within a body that has partially split without breaking into separate parts. For example, a crack may include a live crack produced by fatigue, overload, or material processing. Additionally, the crack may include a cut, a notch, a groove, an indentation; or any other feature resembling a crack.

As used herein, the term "crack tip" refers to an innermost end of the crack within a body. In some embodiments, a crack tip, in a three-dimensional perspective, may be curved (e.g., a circular crack). Additionally, a crack can have more than one crack tip (e.g., a through-crack in a plate).

As used herein, an "activation temperature" refers to a temperature that causes a desired thermally-induced physical response or change within the specimen at or near a crack tip of a crack within the specimen within a given period of time.

Embodiments of the present disclosure include systems and methods for thermally influencing a region of a specimen (e.g., a body or workpiece) at or near a crack tip (referred to hereinafter as "crack tip region") of a crack within the specimen. In some embodiments, the specimen may include an electrically conductive material (e.g., copper, iron, steel, etc.). Some embodiments include an electrothermal system that may apply an electrical current through the specimen. Furthermore, by applying the electrical current through the specimen, the electrothermal system may generate a flux (i.e., electric flux) tangentially around the crack tip of the crack within the specimen. In some embodiments, the electrothermal system may apply the electrical current via one or more of an electrical spark, induction, or a physical electrical connection. Applying an electrical current around a crack tip (e.g., a sharp crack tip) in a specimen made of a conductive material via the manners described herein may result in an asymptotic local flux concentration (i.e., electric current density (J)) represented by the following equation (1) at the crack tip of the crack:

$$J = K_E / \sqrt{2\pi r} \quad (1)$$

where $K_E$ represents the electrical current density intensity factor and where J is the electric current density at a radius r measured from the crack tip of the crack. In this case, the current density intensity factor (CDF) refers to a magnitude of a singular electric current density field of an asymptotic solution for an ideal crack tip in an isotropic homogeneous conductive body represented by $$K_E = \lim_{r \to 0} \left[ J \sqrt{2\pi r} \right].$$

Furthermore, $K_E$ is a function of a shape of the specimen (e.g., body) and any imposed external electrical boundary conditions. For two-dimensional planar geometries, $K_E$ is mathematically analogous to the mode III stress intensity factors found in fracture mechanics handbooks. For example, for a linear through crack of length 2a in an infinite plate (e.g., large compared to the crack length) with a far-field uniform current density $J_\infty$ directed normal to the crack, $K_E = J_\infty \sqrt{\pi a}$ (compared to the well-known expression $K_{III} = T_\infty \sqrt{\pi a}$ for the analogous mode III geometry, where $T_\infty$ is the far-field out-of-plane shear stress). Furthermore, the asymptotic local flux concentration (J) approaches infinity as the crack tip is approached along a radius (i.e., as r approaches zero) measured from the crack tip of the crack. Magnitudes of the asymptotic local flux concentration (J) about the crack tip of the crack may be influenced by geometry and boundary conditions of the specimen. Moreover, because an ohmic heating per unit volume is proportional to $J^2$, a region of the specimen near the crack tip of the crack is locally heated while approaching an asymptotic steady-state temperature distribution represented by the following equation (2):

$$T = T_{tip} - \frac{r K_E^2}{2 \pi \kappa_T \kappa_E} \quad (2)$$

where $T_{tip}$ is the steady-state temperature of the crack tip. $T_{tip}$ is also a function of a geometry and boundary conditions of the specimen, $\kappa_T$ is a thermal conductivity of the specimen, r is a radius measured from the crack tip along the crack length, and $\kappa_E$ is the electrical conductivity of the specimen. In view of the foregoing equation (2), a maximum temperature occurs at the crack tip of the crack, with the temperature dropping with a locally linear temperature gradient in direction extending away from the crack. While equation (2) represents a steady-state condition, transient conditions have the same form, and may likewise be analyzed using theoretical and numerical tools known in the art, and likewise can be utilized to predict local heating near the crack tip of the crack within the specimen, enabling one of ordinary skill in the art to adjust the application of electrical current to a specimen to achieve a predetermined crack tip temperature (i.e., activation temperature).

In some embodiments, the electrothermal system may include an electrical power source configured to supply an electrical current over at least one current versus time cycle (i.e., a cycle representing a magnitude of current versus a period of time that the current is applied the specimen) having a sufficient period of time to achieve an activation temperature within the crack tip region of the crack within the specimen. Causing the crack tip region of the specimen to reach the activation temperature of the specimen may thermally cause a response or physical change in the crack tip region of the specimen while leaving a remote portion of the specimen in a substantially unchanged state.

In some embodiments, an activation temperature (e.g., an activation temperature to be achieved in the crack tip region) and a dwell time of the activation temperature (e.g., an amount of time the activation temperature is achieved) may be selected to cause various types of response or changes (e.g., thermally induced responses or changes). For example, the response or change may include formation of oxides or other chemical reaction products either within a material of the specimen, on an external surface of the specimen inside or outside of the crack or both. In some embodiments, the response or change may include a tinting (i.e., a change of color) of crack tip region (e.g., marking a crack tip region) of the specimen where the activation temperature is achieved. For example, the oxides and chemical reaction products may be detectable optically or via other manners. As is discussed in greater detail below, the oxides and chemical reaction products (e.g., tinted region of the specimen) may form a mark on the specimen at a current location of a crack tip of a crack and may mark an instantaneous size, shape, and length of the crack. As used herein, a "mark" refers to a legible heat tint zone in close proximity to a crack tip of the crack. Additionally, a cycle of applying an electrical current pulse or a series of electrical pulses to a specimen and around a crack tip of a crack to form a mark (i.e., tint a region) at the current crack tip of the crack within the specimen may be referred to herein as a "marking cycle." In some embodiments, the activation temperature specified for marking is selected to be high enough to produce a legible mark, but low enough to avoid structural damage to the material of the specimen. Furthermore, the activation temperature specified for marking is selected to be below the melting point of the material of the specimen. For example, in ambient air, Titanium alloys can be marked with minimal material damage at about 30% of the absolute melting temperature of Titanium.

Some embodiments of the present disclosure include causing the crack tip region of the specimen to achieve relatively higher activation temperatures. For instance, some embodiments may include locally damaging or weakening a physical structure of the crack tip region of the specimen by causing the crack tip region of the specimen to reach a relatively high activation temperature. Locally damaging or weakening the crack tip region of the specimen may facilitate a subsequent initiation of a live (growing) crack. By way of example, for Titanium alloys, locally damaging or weakening the crack tip region of the specimen can be achieved at activation temperatures exceeding about 45% of the absolute melting temperature of Titanium.

One or more embodiments of the present disclosure include causing a crack tip region of the specimen to achieve an activation temperature at or above a melting temperature of the specimen. Causing the crack tip region to achieve an activation temperature at or above a melting temperature may create molten material at the crack tip that fuses opposing faces of the crack and may cause the crack to decrease in size and length. Furthermore, newly joined or rejoined portions of the previous crack may define a new crack tip that becomes a new point of maximum heat generation. Accordingly, a crack tip region of the specimen may melt and may fuse additional portions of the opposing faces of the crack in a capillary manner (e.g., along a length of the crack extending from the crack tip of the crack). The methods may enable a crack to be filled as molten material is drawn up the crack. Additionally, the method may be useful as a welding crack repair technique while requiring and enabling a much narrower melt zone and heat-affected zone in comparison to convectional welding methods.

Selecting activation temperatures approaching or exceeding the vaporization temperature of constituents of the material of the specimen may cause the crack to increase in size as vaporized and/or liquid material is expelled from the crack tip. For materials such as Titanium, which rapidly form brittle oxides with low electrical conductivity when heated in an oxidizing environment, oxide-filled cracks can form and propagate at temperatures below a melting point temperature. The methods described herein may be useful for parting (e.g., splitting) applications of specimens.

In some embodiments, a size (e.g., a diameter) of a region of the specimen affected by the activation temperature (i.e., a size of the region of the specimen caused to reach or exceed the activation temperature) may be increased and decreased, respectively, by increasing or decreasing an amount of electrical current applied through the specimen. Because a remaining portion of the specimen remote to the crack tip is at lower temperature, and thus left in a substantially unchanged state, any global physical responses or changes caused by applying an electrical current through the specimen may be negligible or at least tolerable.

One or more embodiments of the present disclosure include subjecting the specimen to tensile or compressive load to open or close the crack. Subjecting the specimen to tensile or compressive load may include propping the crack to keep the crack in an open configuration (e.g., keep faces of the specimen defining the crack spaced apart) while causing the crack tip region of the specimen to reach an activation temperature (e.g., applying electrical current pulses through the specimen) to avoid shorting across the adjacent faces of the specimen defining the crack (i.e., the adjacent faces of the crack). Compressive or tensile loads applied to a blunt notch can produce highly concentrated compressive or tensile loading of the material near the crack tip (well-known to persons of ordinary skill in fracture mechanics), which, combined with the local heating associated with electrical current can produce thermo-mechanical conditions of interest within a region near the crack tip for empirical studies regarding material performance, microstructural evolution, or even phase changes within the thermally influenced region. The foregoing is useful for evaluating thermal and thermomechanical material behavior at relatively short time-scales.

Other embodiments include a specimen having at least a portion of the thermally or thermo-mechanically influenced region be removable. Having the thermally or thermo-mechanically influenced region be removable permits further physical examination or other use of the thermally or thermal mechanically processed material. Furthermore, the removable portion may be configured to be of different materials than the remainder of the specimen, and need not be conductive. For example, a cylindrical carbon filament coated with nickel as a catalyst may be inserted in a cylindrical cavity at the crack tip and subjected to heat and compression to study the formation of diamond, or to produce diamond filament.

Some embodiments of the present disclosure include subjecting the specimen to a particular environment at least at the crack tip region of the specimen while applying an electrical current pulse or a sequence of electrical current pulses to the specimen. In some embodiments, the environment may include a material that is reactive with the material of the specimen at an activation temperature. In some embodiments, the environment may include an at least substantially inert medium. In some embodiments, the environment may be selected to shield portions of the specimen from reacting with ambient contaminants. In further embodiments, the environment may include an evacuated environment. As non-limiting examples, the environment may be selected to optimize marking a crack tip of the crack, or the environment may be selected to be favorable for welding applications (e.g., filling the crack applications). In some embodiments, the environments may be introduced to the specimen via conventional manners such as, for example, a jet of a gaseous or liquid medium, a submersion tank, an environmental chamber, and/or a vacuum chamber.

In some embodiments, the at least one-current-versus-time cycle, described above, may range in complexity depending on a desired response or change of the specimen. For instance, in embodiments including crack initiation or parting processes, the at least one current-versus-time cycle may include a single pulse resulting from the discharge of a capacitor within the electrothermal system through the specimen that achieves an activation temperature at the crack tip region for sufficient time period to obtain the desired change (e.g., tint) in the specimen. In additional embodiments, the at least one current-versus-time cycle may include maintaining a current within a pulse for a dwell time of a predetermined magnitude and duration. For example, a precisely timed constant-current pulse or series of pulses may enable relatively precise control of a temperature of the crack tip region within the specimen in order to complete a desired response or change within the specimen within a relatively close tolerance of a given activation temperature. Furthermore, completing a desired change (e.g., marking a location of a crack tip of a crack) within a relatively close tolerance of a given activation temperature may enable a creation of a legible mark in the crack tip region while minimizing thermally-induced artifact in a crack growth test. As used herein, the term "artifact" refers to deviations in conventional crack growth test results resulting from marking a location of a crack tip of a crack. In other words, marking a location of a crack tip of a crack at particular points during a conventional crack growth test may not significantly influence a growth of the crack during the crack growth test.

Some embodiments of the present disclosure include creating multiple marks (i.e., performing multiple marking cycles) on a specimen to record a progression of a crack growth within a specimen via the methods described above and with a zero-current pause (i.e., a period of time during which no current passes through the specimen) between subsequent marking cycles, while the crack is grown by mechanical or other means. In some embodiments, as a crack propagates (e.g., grows), an optimal amount of current (e.g., a current magnitude) and dwell time to mark the crack tip of the crack changes, and in turn, optimally marking the crack tip of the crack requires a marking cycle that changes as the crack grows. Moreover, in some embodiments, a power source for applying the pulses of current may be operably coupled to a controller that enables properties of the marking cycles (e.g., current magnitude, dwell times of pulses, a number of pulses, etc.) to be adjusted based on a crack growth.

Further embodiments of the present disclosure include applying a pulse having a width within a sonic or ultrasonic range and selecting an activation temperature to generate an acoustic signal in response to changes caused by the pulse applied to the specimen (e.g., a sudden thermal expansion of a region of the specimen). Furthermore, even in the absence of an externally applied magnetic field, a magnetic field generated by an electrical current passing around a crack tip of a crack may potentially interact with the electrical current to induce Lorentz forces (combinations of electric and magnetic forces on a point charge due to electromagnetic fields) within the crack tip region of the specimen. Moreover, the induced Lorentz forces may augment the acoustic signal caused by changes to the specimen. Additionally, in some embodiments, the acoustic signal, which is emitted from the crack tip region of the specimen, may be detectable by an acoustic sensor (e.g., a microphone or ultrasonic transducer). Additional embodiments include detecting a presence and/or location of a crack within a specimen based on the acoustic signal. By further analyzing a magnitude and/or other characteristics of the signal (e.g., a shape or harmonics of the signal), additional information about the crack (e.g., a size and shape of the crack) may be determined. For example, a magnitude of the signal may be generally proportional to a size of the crack. In some embodiments, multiple sensors may be disposed at different locations on the specimen, and conventional triangulation methods may be utilized to determine locations of the crack and/or crack tip of the crack.

FIG. 1A is a schematic representation of a testing system 100 for thermally influencing at least a portion of (e.g., thermally inducing a response or change in) a specimen 102 during a conventional crack growth test (referred to hereinafter as a "crack growth test"). For example, the crack growth test may include a crack growth test which is periodically paused at one or more crack lengths. For instance, the crack growth test may include any conventional fatigue crack growth test. Additionally, as is described in greater detail below, crack marking methods described herein may be used to thermally mark a crack tip 111 of the crack 113 and record a crack size and shape of the crack 113.

In some embodiments, the thermally induced response or change may include a detectable formation of oxides or other detectable chemical reaction products either within a material of a specimen 102 undergoing the crack growth test, or on an external surface of the specimen 102 inside or outside of the crack 113. In other words, the response or change may include tinting a portion of the specimen 102. As used herein, the term "tint" and its derivatives includes a distinguishable change in color or appearance of a surface of the specimen 102 that occurs over time during an elevated temperature exposure. The tint may be associated with the formation of surface oxides or other ambient reactants. In additional embodiments, the response or change may include locally damaging or weakening a physical structure of a portion of the specimen 102. In further embodiments, the response or change may include melting at least a portion of the specimen 102. Each of the foregoing thermally induced responses or changes is described in greater detail below.

In some embodiments, the testing system 100 may include an electrothermal system 103, a load application system 104, and controller 106. As is described in greater detail below, the electrothermal system 103 may include an automated system for sending controlled electrical current pulses through the specimen 102 to apply electrothermal heating to a crack tip 111 of a crack 113 within the specimen 102.

The electrothermal system 103 may include a power supply 108 for supplying one or more pulses of current to the specimen 102 and a plurality of electrical connections 110 electrically connecting the power supply 108 to the specimen 102. For instance, the power supply 108 may include a capacitor 112 that may be charged to a desired voltage to feed pulses of current to the specimen 102. The capacitor 112 may have a sufficient capacity to sustain a required amperage over a pulse width of a pulse. In some embodiments, the capacitor 112 may have a capacity within a range of 100 to 10,000 Farads with a 5-50V rating.

In some embodiments, the plurality of electrical connections 110 may be attached to the specimen 102 at locations of the specimen 102 to match an electric Current Density Intensity Factor (CDIF) solution of the specimen 102. As used herein, the CDIF solution may refer to values of $K_E$ as a function of crack length and electric current load for a given specimen 102 configuration, fit to an equation or tabulated in normalized form $K_E B\sqrt{W}/I=f(a/W)$ where a is the crack length, B is a thickness of the specimen 102, W is the crack length at failure, and I is the applied current load. For instance, the electrical connections 110 may be connected to the specimen 102 at locations to maximize the CDIF for a given current load spanning a crack mouth (i.e., opening of the crack 113 at an edge of the specimen 102) of the crack 113 within the specimen 102. In some embodiments, the electrical connections 110 may include welded or brazed electrical connections. In additional embodiments, the electrical connections 110 may include mechanical connections (e.g., fasteners). In some embodiments, at least one of the electrical connections 110 may be connected (e.g., attached) to the specimen 102.

Figure 1B:
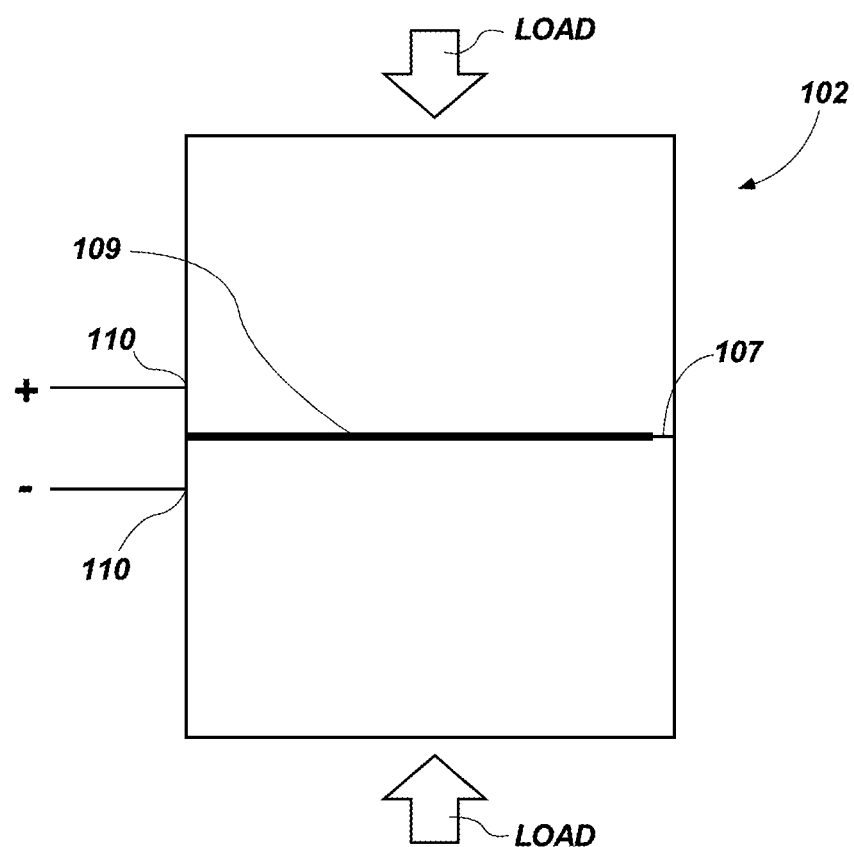
FIG. 1B is a simplified schematic representation of a specimen according to one or more embodiments of the present disclosure.

FIG. 1B is a schematic representation of a specimen 102 according to one or more embodiments of the present disclosure. Referring to FIGS. 1A and 1B together, in further embodiments, an insulative material 109 (e.g., a dielectric welding flux) may be disposed between the electrical connections 110 and the specimen 102 or between portions of the specimen 102. For instance, a relatively thin layer of insulative and/or dielectric material 109 may be disposed between the electrical connections 110 and the specimen 102 or between two portions of the specimen 102 as depicted in FIG. 1B. For example, an interface between the two portions of the specimen 102 may be partially coated with a dielectric material 109 while leaving at least some additional regions of the two portions to contact each other. Accordingly, the two portions of the specimen 102 may be in partial contact at a contact region 107. Additionally, in such embodiments, a gap between the two portions of the specimen 102 created via the dielectric material 109 may act as a crack or an additional crack from an electrical perspective and may serve as a crack tip of a crack. In some embodiments, the configuration depicted in FIG. B may be used in joining or welding methods, such as the methods described below in regard to FIG. 5. In joining and/or welding methods, the insulative material 109 (e.g., welding flux material) may be selected to melt away as the material of the specimen 102 melts and the separate portions (e.g., pieces) of the specimen 102 are joined. The insulative material 109 may further be selected to mitigate effects of surface oxidation and conditions adverse to a quality weld. The insulative material 109 (e.g., welding flux material) may include any welding flux materials known in the art that are compatible with the material of the specimen 102 and that exhibiting a low electrical conductivity (e.g., less than about 10% of the electrical conductivity of the material of the specimen 102 being joined).

Referring to FIG. 1A, in additional embodiments, the electrical connections 110 may not be in contact with the specimen 102. In such embodiments, current may be generated within at least a portion of the specimen 102 (e.g., pulses of current may be generated within at least a portion of the specimen 102) via induction. For instance, the electrical connections 110 may include one or more inductors, and the specimen 102 may include at least one inductor.

In some embodiments, the electrothermal system 103 may be operably coupled to the controller 106, and the power supply 108 of the electrothermal system 103 may be operated by the controller 106. In some embodiments, the controller 106 may include at least one processor 116 (e.g., microprocessor), a memory 118, a storage device 120, a data acquisition system 122, a user interface 124, and one or more sensors 126. The processor 116 may include a microprocessor, a field-programmable gate array, and/or other suitable logic devices. In some embodiments, the processor 116 includes hardware for executing instructions, such as those making up a computer program. As an example and not by way of limitation, to execute instructions, the processor 116 may retrieve (or fetch) the instructions from an internal register, an internal cache, the memory 118, or the storage device 120 and decode and execute them. In some embodiments, the processor 116 may include one or more internal caches for data, instructions, or addresses. As an example and not by way of limitation, the processor 116 may include one or more instruction caches, one or more data caches, and one or more translation lookaside buffers (TLBs). Instructions in the instruction caches may be copies of instructions in the memory 118 or the storage device 120. In some embodiments, the processor 116 is operably coupled to send data to a computing device operatively coupled (e.g., over the Internet) to the controller 106, such as a server or personal computer.

The memory 118 may be used for storing data, metadata, and programs for execution by the processor(s). The memory 118 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 118 may be internal or distributed memory. In some embodiments, the memory 118 may store algorithms and/or parameters for operating the load application system 104, charging the capacitor 112 of the power supply 108 of the electrothermal system 103, applying current pulses to the specimen 102, calculating temperatures of regions of the specimen 102, calculating the electrical CDIF of the specimen 102, calculating needed pulse widths, executing pulses by electrically connecting the capacitor 112 of the electrothermal system 103, etc., to be executed by the processor 116.

The storage device 120 includes storage for storing data or instructions. As an example and not by way of limitation, storage device 120 can comprise a non-transitory storage medium described above. The storage device 120 may include a hard disk drive (HDD), a floppy disk drive, flash memory, an optical disc, a magneto-optical disc, magnetic tape, a Universal Serial Bus (USB) drive or a combination of two or more of these. The storage device 120 may include removable or non-removable (or fixed) media, where appropriate. The storage device 120 may be internal or external to the controller 106. In some embodiments, the storage device 120 is non-volatile, solid-state memory. In other embodiments, the storage device 120 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The data acquisition system 122 may receive signals (e.g., indications of temperatures) from the one or more sensors 126 or any other sensor and may include, or have associated therewith, analog-to-digital conversion circuitry to convert analog signals from the sensors 126 into digital numeric values that can be manipulated and/or analyzed by the controller 106 (e.g., the processor 116 and/or the data acquisition system 122). The data acquisition system 122 may further include one or more software programs developed using various general purpose programming languages such as Assembly, BASIC, C, C++, C#, Fortran, Java, LabVIEW, Lisp, Pascal, etc. As a non-limiting example, the controller 106 may include any data acquisition system known in the art.

The sensors 126 may be connected to leads from the data acquisition system 122 and may be attachable to the specimen 102. The sensors 126 may include one or more of temperatures sensors, acoustic sensors, strain sensors (e.g., strain gauges), or any other sensors. For instance, the sensors 126 may include any conventional temperature sensor. The data acquisition system 122 may receive signals from the sensors 126 indicating one or more of a temperature of one or more portions of the specimen 102, acoustic signals detected within the specimen 102, strains experienced by the specimen 102, etc. and based on determined temperatures, acoustic signals, and/or strains of the specimen 102, the controller 106 may operate the electrothermal system 103 (e.g., pulses supplied to the specimen 102 by the electrothermal system 103). The sensors 126 are described in greater details in regard to FIGS. 2-6.

The user interface 124 allows a user to provide input to, receive output from, and otherwise transfer data to and receive data from controller 106. The user interface 124 may include a mouse, a keypad or a keyboard, a touch screen, a camera, an optical scanner, network interface, modem, other known user devices or a combination of such user interfaces. The user interface 124 may include one or more devices for presenting output to a user, including, but not limited to, a graphics engine, a display (e.g., a display screen), one or more output drivers (e.g., display drivers), one or more audio speakers, and one or more audio drivers. In certain embodiments, the user interface 124 is configured to provide graphical data to a display for presentation to a user. The graphical data may be representative of one or more graphical user interfaces and/or any other graphical content as may serve a particular implementation. The one or more graphical user interfaces displayed by the user interface 124 are described in greater detail below in regard to FIGS. 3A and 3C.

As noted above, the controller 106, via the at least one processor 116, may control a capacitor voltage of the capacitor 112, monitor temperatures of the specimen 102, calculate the electrical CDIF of the specimen 102, calculate needed pulse widths, and execute pulses by electrically connecting the capacitor 112 to the specimen 102.

Referring still to FIG. 1A, the load application system 104 may include any conventional mechanical test rig for performing fatigue crack growth testing. For example, the load application system 104 may include two connector portions 128a, 128b for securing to portions of the specimen 102 on opposite sides of a crack 113 within the specimen 102. Moreover, the load application system 104 may be capable of causing a tension stress within (e.g., applying a tensile load to) the specimen 102 to open a crack 113 within the specimen 102 (i.e., separate opposing walls defining the crack 113 within the specimen 102) and/or a compression stress to the specimen 102 to at least partially close the crack 113 within the specimen 102. Additionally, the load application system 104 may be capable of causing shear stresses in the specimen 102 in any direction and within the crack tip region 114 of the crack 113. For instance, the load application system 104 may include any of the mechanical test rigs conventionally utilized in fatigue crack test methods such as, for example, ASTM E2760 for measure of fatigue crack growth rates, ASTM E2714 for creep-fatigue testing, ASTM E2760 for creep-fatigue crack growth, and ISO 11782-2. Furthermore, the load application system 104 may include any of the mechanical test rigs conventionally utilized in crack growth test methods such as, for example, ASTM E647, ASTM E1820, ASTM E399, and/or ASTM E561. Moreover, the load application system 104 may include any of the mechanical test rigs described in, for example, U.S. Pat. No. 8,544,338 B2, to Pettit, issued Oct. 1, 2013, the disclosure of which is incorporated in its entirety be reference herein.

Furthermore, the controller 106 may also control operation of the load application system 104. For instance, the controller 106 may cause the load application system 104 to apply loads to the specimen 102 according to conventional fatigue crack test methods. Furthermore, as is described in greater detail below, the controller 106 may cause the load application system 104 to stop applying (i.e., pause applying) loads to the specimen 102 while the electrothermal system 103 applies one or more pulses of current to the specimen 102. Additionally, in some embodiments, the controller 106 may cause the load application system 104 to apply a static load to the specimen 102 while the electrothermal system 103 applies one or more pulses of current to the specimen 102. In further embodiments, the controller 106 may cause load application simultaneously with electrothermal heating from the electrothermal system 103.

In some embodiments, the electrothermal system 103 may cause (e.g., generate) current densities through a given specimen 102 within a range of 1.0 A/mm$^2$ to about 100 A/mm$^2$ (gross) by applying the pulses of current to the specimen 102. The operation of the electrothermal system 103 is described in greater detail in regard to FIGS. 2-3C.

Figure 2:
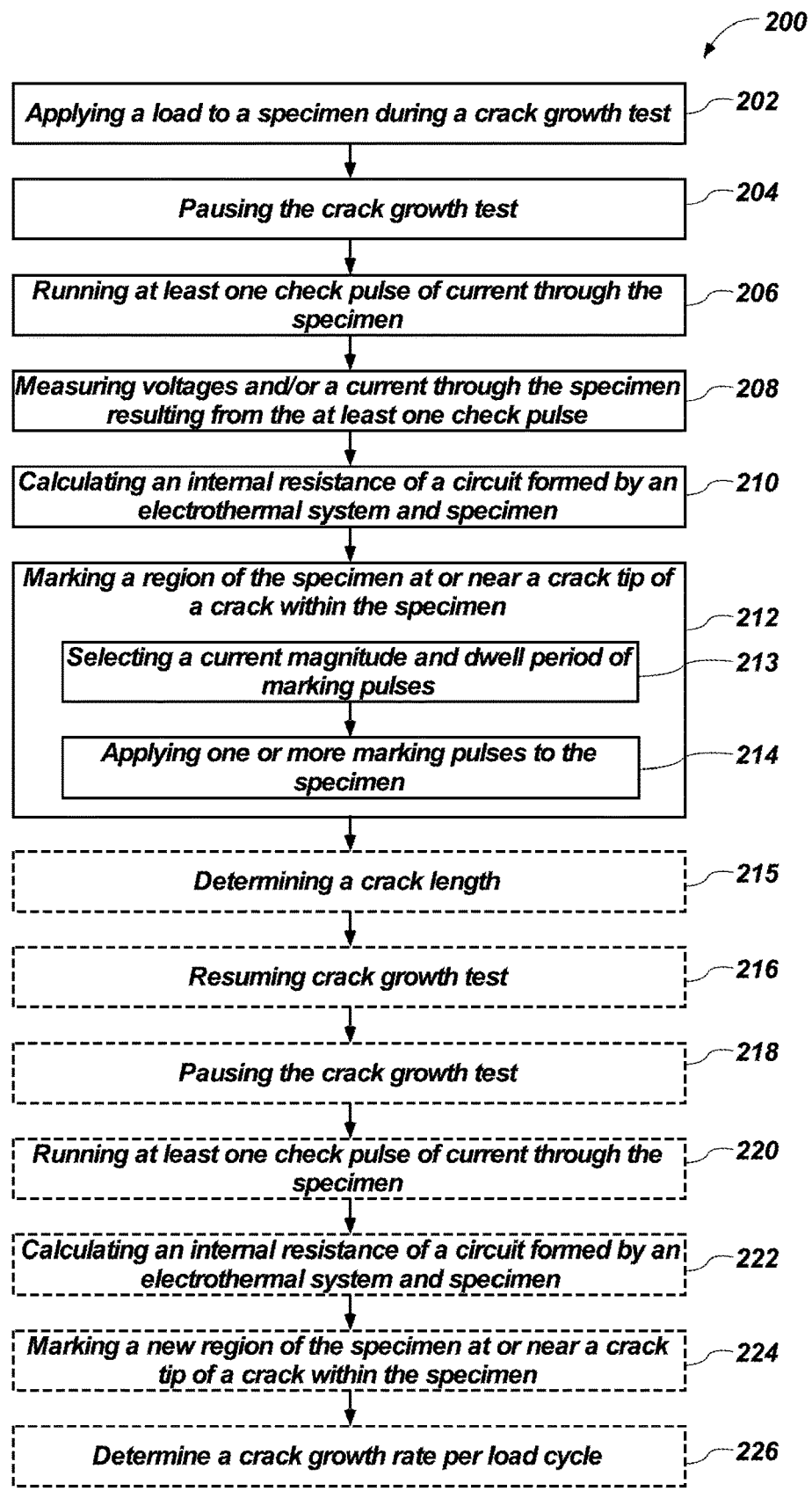
FIG. 2 is a flow chart of a method of marking a crack tip region of a crack within a specimen during a crack growth test according to one or more embodiments of the present disclosure.

FIG. 2 shows an example process 200 for marking crack growth (e.g., propagation) by marking a crack tip 111 of a crack 113 within a specimen 102 utilizing electrothermal processes via a schematic-flow diagram. For instance, FIG. 2 shows one or more embodiments of a simplified sequence-flow that the testing system 100 (FIG. 1A) utilizes to mark instantaneous locations of a crack tip 111 during a crack growth test. Put another way, FIG. 2 shows one or more embodiments of electrothermal marking of a sequence of crack tip 111 locations on a fracture surface of a specimen 102 undergoing a crack growth test. As shown in FIG. 2, the process 200 may include applying a load to a specimen 102 having a crack 113 formed therein during the crack growth test, as shown in act 202 of FIG. 2. In some embodiments, applying a load to the specimen 102 may include applying a load to the specimen 102 via any of the load application systems 104 and manners described above in regard to FIG. 1A in conventional manners.

Additionally, the process 200 may include pausing the crack growth test, as shown in act 204 of FIG. 2. For instance, the process 200 may include pausing a load applied to the specimen 102 with the load application system 104. In some embodiments, pausing the crack growth test may include removing any load applied to the specimen 102 with the load application system 104. In additional embodiments, pausing the conventional crack growth test may include maintaining at least some load applied to the specimen 102 with the load application system 104. For instance, a relatively small load (e.g., a tensile load) may be sustained by the load application system 104 to avoid shorting across faces of the crack 113 in later acts of the process 200 (e.g., applying pulses of the current to the specimen 102).

Moreover, while the crack growth test is paused, the process 200 may include applying at least one check pulse of current (referred to hereinafter as "at least one check pulse) through the specimen 102, as shown in act 206 of FIG. 2. Additionally, in some embodiments, the at least one check pulse may be applied at a voltage and pulse width (typically, a relatively short pulse width) selected to avoid any physical damage to the specimen 102. For instance, the voltage and pulse width of the at least one check pulse may be determined (e.g., selected) based on a rated internal resistance of electrothermal system 103, which may be known. For example, in some embodiments, the at least one check pulse may have a voltage within a range of about 10V and about 50V and a pulse width within a range of 0.1 milliseconds and about 200 milliseconds. In some embodiments, a size of a thermally influenced region may be generally proportional to the square root of the pulse width.

By applying the at least one check pulse through the specimen 102, the process may include measuring response voltages across and/or a current through the specimen 102, as shown in act 208 of FIG. 2. For example, act 208 may include detecting response voltages across and/or a current through the specimen 102 utilizing the electrothermal system 103 and the controller 106 via conventional methods.

Moreover, based at least partially on the voltage and current measurements recorded during act 208 and a magnitude of the at least one check pulse, the process 200 may include calculating an internal resistance (R=V/I) of a circuit formed by the electrothermal system 103 and the specimen 102 (e.g., a resistance of the specimen 102), as shown in act 210 of FIG. 2. Moreover, as is discussed in greater detail below, the electrothermal system 103 may be operated by the controller 106 to apply subsequent pulses of current of a known $K_E$ (Electrical Current Density Intensity Factor $(A^* m^{-3/2})$) based on the known internal resistance of the circuit formed by the electrothermal system 103 and the specimen 102. Additionally, as described in greater detail below, $K_E$ and a crack tip 111 temperature $T_{tip}$ that may be attained during the subsequent pulses applied by the electrothermal system 103 can be estimated by the following equation:

$$T_{tip} = T_{spec} + (K_E^2 / 2K_T K_E) \sqrt{\alpha \Delta t_{pulse}/\pi} \qquad (4)$$

Upon determining the internal resistance of the circuit formed by the electrothermal system 103 and the specimen 102, the process 200 may include marking a region (referred to herein as "crack tip region 114") of the specimen 102 at or near a crack tip 11 within the specimen 102, as shown in act 212 of FIG. 2. In some embodiments, marking a present (i.e., instant) crack tip region 114 within the specimen 102 may include selecting a current (I) magnitude of subsequent pulses of current (referred to hereinafter as "marking pulses") and dwell times ($\Delta t_{pulse}$) of the marking pulses to cause the crack tip region 114 of the specimen 102 to achieve (e.g., reach) a target activation temperature (e.g., a tint temperature ($T_{tint}$)) during each marking pulse, as shown in act 213 of FIG. 2. As used herein, the term "tint temperature" or $T_{tint}$ may refer to a temperature above a tint threshold temperature and selected for heat tint formation at the crack tip region 114 of the crack 113 within the specimen 102. Furthermore, the tint temperature may be associated with a characteristic tint color or appearance based on conventional heat tint methods. Moreover, the "tint threshold temperature" ($T_{Th}$) may refer to a lowest temperature at which observable heat tinting occurs within a given period of time (e.g., a tint interval) of achieving the tint temperature ($T_{tint}$). In some embodiments, the "tint threshold temperature" may be proportion to a melting temperature ($T_{melt}$) of a given material of the specimen 102. For instance, the "tint threshold temperature" may be between about 0.20 $T_{melt}$ and about 0.50 $T_{melt}$.

Referring to equation (4), material parameters of the specimen 102, such as $K_T$ (thermal conductivity $(W^* m^{-1*} C^{o-1})$), $K_E$ (electrical conductivity $(A^* V^{-1*} m^{-1})$), and α (thermal diffusivity $(m^{2*} s^{-1})$) may vary based on a temperature of the specimen 102. Accordingly, subsequent marking pulses (i.e., the current (I) magnitude of subsequent marking pulses and the dwell times ($\Delta t_{pulse}$) of the subsequent marking pulses) may be constantly adjusted based on measured and/or calculated temperatures of the specimen 102 during preceding pulses. For instance, due to multiple marking pulses being applied to the specimen 102, an overall temperature of the specimen 102 may increase, and as a result, the current (I) magnitude of subsequent marking pulses and/or the dwell times ($\Delta t_{pulse}$) of the subsequent marking pulses may be decreased to compensate for the increased temperature of the specimen 102. Furthermore, as the specimen 102 heats, raising the crack tip to the activation temperature requires less heat input.

In some embodiments, selecting a current (I) magnitude of subsequent current pulses may include selecting a current (I) within a range of about 500 A and about 10000 A. For instance, the foregoing range of current (I) magnitudes may be applicable for specimens having a cross-sectional area within a range of about 0.1 and about 1 inch². One of ordinary skill in the art will recognize that the current (I) magnitude may vary depending on the size of the specimen 102 and that any current (I) magnitudes are within the scope of the present disclosure. Additionally, in some embodiments, selecting a dwell time ($\Delta t_{pulse}$) may include selecting a dwell time ($\Delta t_{pulse}$) within a range of about 0.1 milliseconds and about 2000 milliseconds. For instance, dwell time ($\Delta t_{pulse}$) may be within a range of about 0.3 milliseconds and about 200 milliseconds.

Additionally, in some embodiments, marking a present (i.e., instant) location of a crack tip region 114 of a crack 113 within the specimen 102 may include applying one or more marking pulses to the specimen 102, as shown in act 214 of FIG. 2. As noted above, in some embodiments, the one or more marking pulses may be of a known $K_E$ based on the known internal resistance of the circuit formed by the electrothermal system 103 and the specimen 102. Additionally, as mentioned above, the one or more marking pulses may be generated by the capacitor 112 of the power supply 108 of the electrothermal system 103 being charged to a selected voltage, as described above in regard to FIG. 1A. For instance, the one or more marking pulses may be applied to the specimen 102 via any of the manners described above in regard to FIG. 1A. Applying the one or more marking pulses to the specimen 102 may generate a flux (i.e., a measure of flow of electric field) tangentially around the crack tip 111 and within the crack tip region 114 of the specimen 102, generate a flux concentration about the crack tip 111, generate heat within the crack tip region 114 of the specimen 102, and cause a temperature of the specimen 102 to rise within the crack tip region 114 of the crack 113 as is discussed below.

In some embodiments, the one or more marking pulses may include a sequence of distinct marking pulses. For instance, the one or more marking pulses may include three, five, ten, fifty, one hundred, or more sequential marking pulses. Additionally, each marking pulse of the sequence of marking pulses may have a dwell time ($\Delta t_{pulse}$) calculated to bring the crack tip region 114 to the tint temperature $T_{tint}$ momentarily per the following equation:

$$\Delta t_{pulse} = \{(T_{tint} - T_{spec})(\kappa_T \kappa_E / K_E^2)\}^2 \frac{4\pi}{\alpha} \tag{5}$$

In some embodiments, causing the crack tip region 114 to achieve the activation temperature may not substantially increase (i.e., raise) a temperature of a remote portion of the specimen 102 (e.g., a portion of the specimen 102 not including the crack tip region 114). Furthermore, during each marking pulse, an amount of hot time, $\Delta t_{hot}$ is accumulated at the crack tip region 114, and the hot time, $\Delta t_{hot}$, contributes to a local heat tint of the crack tip region 114 of the crack 113. The hot time, $\Delta t_{hot}$, may be estimated as a portion of $\Delta t_{pulse}$ that is midway between $T_{tint}$ and $T_{th}$ or higher based on the following equation:

$$\Delta t_{hot} = \Delta t_{pulse} \frac{T_{tint} - T_{th}}{T_{tint} - T_{spec}} \tag{6}$$

The hot time, $\Delta t_{hot}$, may be accumulated during each successive marking pulse of the sequence of marking pulses until the total hot time, $\Delta t_{tot}$, reaches or exceeds a specified marking time, $\Delta t_{cum}$. In some embodiments, the marking time, $\Delta t_{cum}$, may be within a range of about 1 milliseconds to about 10 min. Upon achieving the specified marking time, $\Delta t_{cum}$, the mark on the specimen 102 at the crack tip region 114 may be complete and detectable (e.g., optically detectable). Furthermore, the mark on the specimen 102 may indicate a location of a crack tip 111 within the specimen 102 at the instant in time when the sequence of marking pulses was applied to the specimen 102. For example, the mark on the specimen 102 may indicate a location of the crack tip 111 at the point of the crack growth test when the crack growth test was paused, as described above in regard to acts 202 and 204 of FIG. 2. In some embodiments, a mark width (i.e., a distance between a leading edge and a trailing edge of a mark) of the mark on the specimen 102 may be estimated and selected utilizing the following equation:

$$r_{th} = 2\pi K_T K_E (T_{tint} - T_{th}) / K_E^2 \tag{7}$$

Referring to acts 204 and 212-214 of FIG. 2 together, as noted above, act 212 of marking the specimen 102 may occur while the crack growth test is paused (i.e., act 204 of FIG. 2). Furthermore, in some embodiments, a mechanical force (i.e., load) applied to the specimen 102 by the load application system 104 during the crack growth test may be maintained during acts 212-214 of FIG. 2. Furthermore, a compressive electrothermoelastic stress intensity factor ($K_{ETE}$) occurring at the end of each marking pulse during acts 212-214 is represented by the following equation:

$$K_{I\ ETE} = -0.760 \frac{E \alpha_{CTE} (T_{tint} - T_{spec})(\alpha \Delta t_{pulse})^{\frac{1}{4}}}{1 - \nu} \tag{8}$$

As will be appreciated by one of ordinary skill in the art, the foregoing equation (8) is based on an asymptotic solution for a semi-infinite crack 113 in an infinite body, and thus, may overestimate the stress intensity factor (K) in finite specimens. Accordingly, the mechanical force applied by the load application system 104 while marking the specimen 102 may be selected such that:

$$K_I \gtrsim 2 - K_{I\ ETE} \tag{9}$$

In view of equation 9, the mechanical force applied by the load application system 104 while marking the specimen 102 may be selected to ensure that a crack 113 within the specimen 102 is open to avoid shorting across crack faces of the crack 113.

Upon marking the crack tip region 114 of the specimen 102, the process 200 may include determining a crack length of the crack 113, as shown in act 215 of FIG. 2. In some embodiments, determining a crack length of the crack 113 may include determining the crack length via conventional methods such as potential drop, compliance, and/or optical methods. In additional embodiments, determining a crack length of the crack 113 may include determining the crack length based on the mark at the crack tip region 114 of the crack 113 for a given instant during the crack growth test.

Additionally, upon marking the crack tip region 114 of the specimen 102, the process 200 may optionally include resuming the crack growth test for a period of time, as shown in act 216 of FIG. 2. As is described in greater detail below, the crack growth test may be resumed and may be paused again for each additional mark to be made. For instance, resuming the crack growth test may include applying loads to the specimen 102 to cause crack propagation of the crack 113 via the load application system 104. As a non-limiting example, act 216 may include applying loads to the specimen 102 via any of the manners described above in regard to act 202 of FIG. 2.

Additionally, the process 200 may optionally include again pausing the crack growth test, as shown in act 218 of FIG. 2. As noted above, in some embodiments, pausing the crack growth test may include removing any load applied to the specimen 102 with the load application system 104. As mentioned above, in additional embodiments, pausing the crack growth test may include maintaining at least some load applied to the specimen 102 with the load application system 104. For instance, a relatively small load (e.g., a tensile load) may be sustained by the load application system 104 to avoid shorting across faces of the crack 113 while applying marking pulses to the specimen 102. For example, pausing the crack growth may include any of the actions described above in regard to act 204 of FIG. 2.

Moreover, the process 200 may optionally include applying at least one current check pulse through the specimen 102 and calculating a new internal resistance (R=V/I) of a circuit formed by the electrothermal system 103 and the specimen 102, as shown in acts 220 and 222 of FIG. 2, respectively. For example, act 220 may include applying at least one check pulse through the specimen 102 via any of the manners described above in regard to act 206 of FIG. 2, and act 222 may include calculating the internal resistance of the circuit via any of the methods described above in regard to act 208 of FIG. 2.

Furthermore, upon determining the new internal resistance of the circuit formed by the electrothermal system 103 and the specimen 102, the process 200 may optionally include marking a new crack tip region within the specimen 102, as shown in act 224 of FIG. 2. For example, the process 200 may include marking the new crack tip region via any of the actions described above in regard to acts 212 and 214.

Upon marking the new crack tip region, a crack growth rate per cycle (e.g., load cycle) may be determined via conventional methods, as shown in act 226 of FIG. 2. Additionally, acts 215-226 can be repeated until the crack growth test is completed.

Referring to acts 212-224 together, in some embodiments, to promote consistent marking of the crack tip 111 (e.g., creating marks of same width and tint at given crack tips) of the crack 113 (i.e., to promote a same crack tip 111 temperature used to create each mark), an approximate value of a crack length of the crack 113 corresponding to each mark may be utilized when calculating and selecting $K_E$ (Electrical Current Density Intensity Factor $(A*m^{-3/2})$) for marking pulses. Furthermore, as noted above in regard to act 214 of FIG. 2, $K_E$ affects $\Delta t_{pulse}$, and $\Delta t_{pulse}$ may be re-calculated based on the crack length. In some embodiments, achieving consistent marking of the crack tip 111 may be accomplished by setting the conventional crack growth test to pause for marking at predetermined crack lengths, and the crack lengths are anticipated during marking. In additional embodiments, at each mark, the crack length of the crack 113 may be measured using conventional crack length measuring techniques.

In some embodiments, for crack growth tests operating at a controlled temperature below a tint threshold temperature, the temperature of the specimen 102 may be maintained as the test is paused for marking.

Figure 3A:
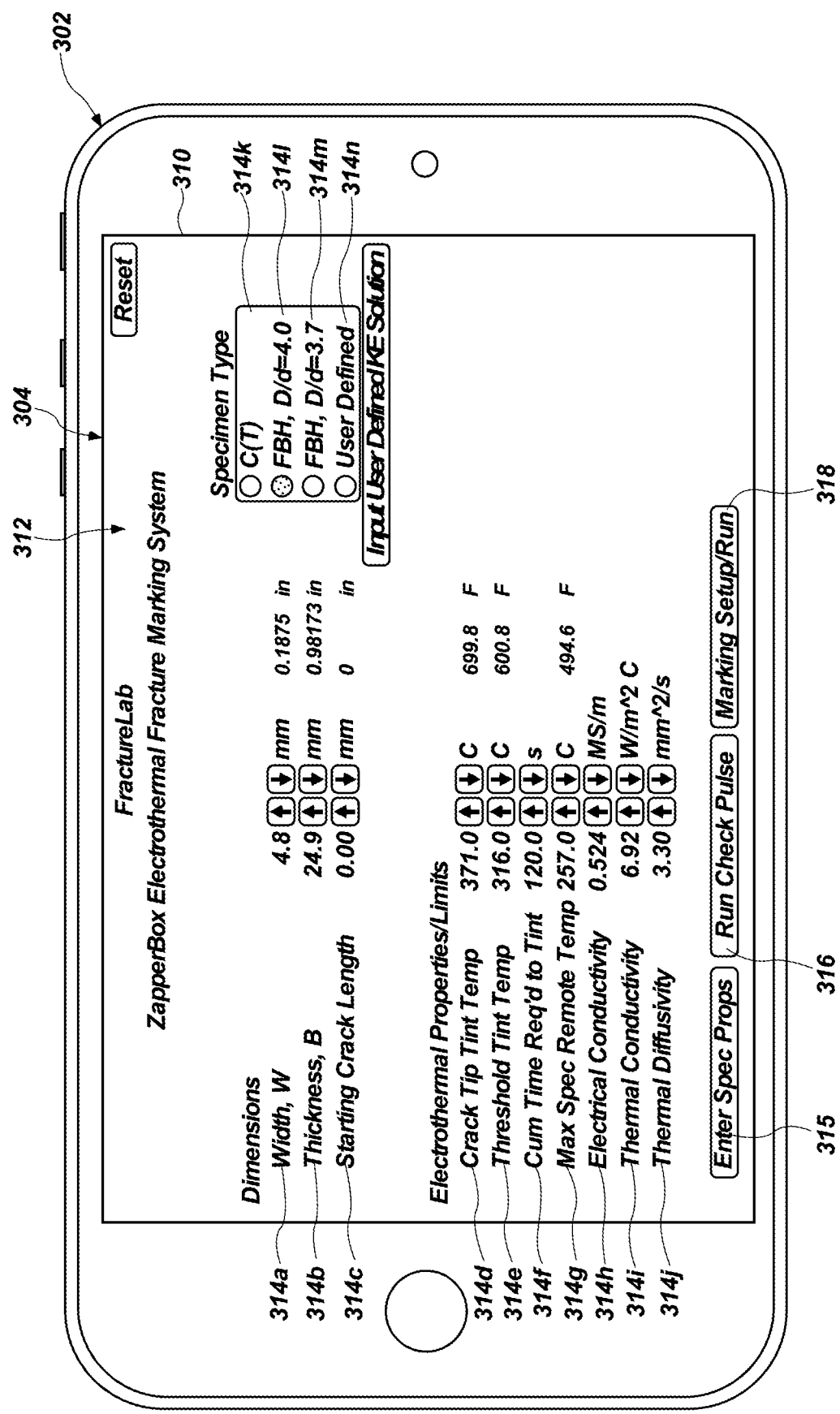
FIGS. 3A-3C show graphical user interfaces displayable on a user interface of the testing system and for operating the testing system according to one or more embodiments of the present disclosure.
Figure 3B:
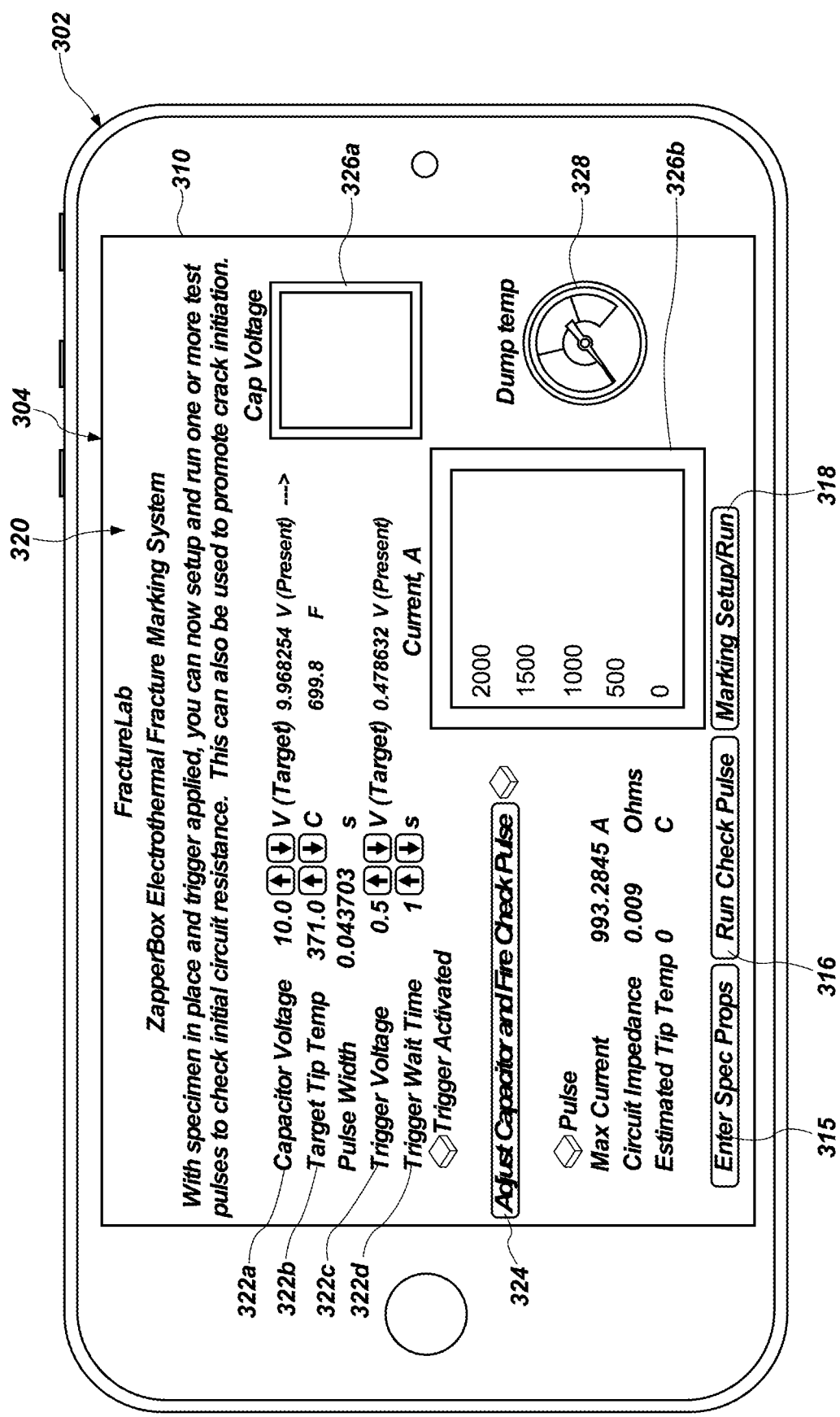
Figure 3C:
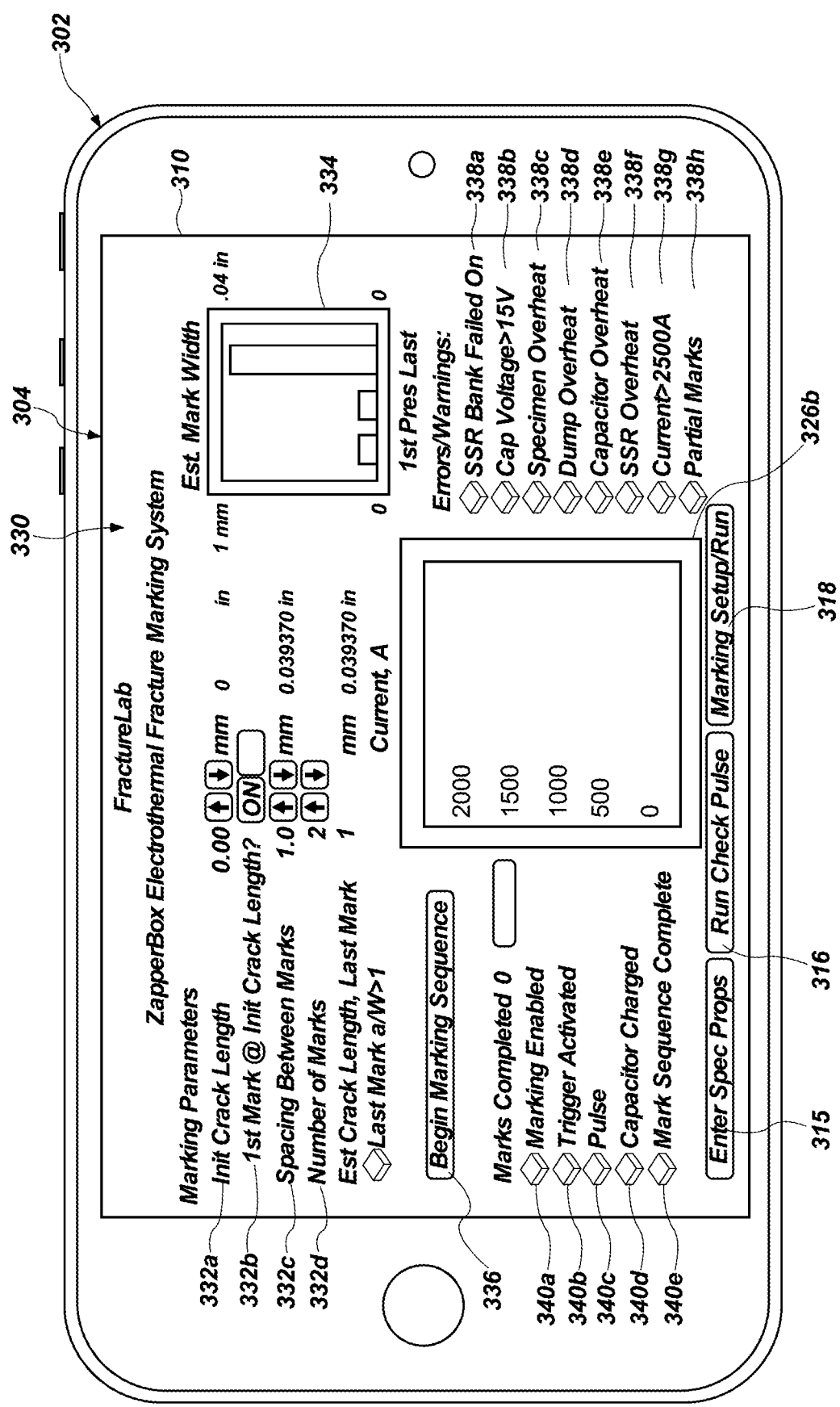

FIGS. 3A-3C show a collection of user interfaces including features of the testing system 100 according to one or more embodiments of the present disclosure. As will be described in more detail below, the components of the testing system 100 as described in regard to FIGS. 1A-2 can provide, along and/or in combination with the other components, one or more graphical user interfaces ("GUIs") via the controller 106 and user interface 124 of the controller 106. In particular, the components can allow a user to interact with a collection of display elements for a variety of purposes. For instance, FIGS. 3A-3C and the description that follows illustrate various example embodiments of the user interfaces and features that are in accordance with one or more embodiments of the present disclosure.

For example, FIG. 3A illustrates a user device 302 that may implement one or more of the components or features of the testing system 100. In some embodiments, the user device 302 is a handheld device, such as a tablet device. As used herein, the term "handheld device" refers to a device sized and configured to be held/operated in one or more hands of a user. In additional or alternative examples, however, any other suitable computing device, such as, but not limited to, a mobile phone device, larger wireless device, laptop or desktop computer, a personal digital assistant device, and/or any other suitable computing device can perform one or more of the processes and/or operations described herein.

The user device 302 includes a touch screen display 304 that can display user interfaces. Furthermore, the user device 302 receives and/or detects user input via the touch screen display 304. As used herein, a "touch screen display" refers to the display of a touch screen device. In some embodiments, a touch screen device may be the user device 302 with at least one surface upon which a user may perform touch gestures (e.g., a laptop, a tablet computer, a personal digital assistant, a media player, a mobile phone, etc.). Additionally, or alternatively, the user device 302 may include any other suitable input device (e.g., a keyboard, a mouse, etc.).

As shown in FIG. 3A, the touch screen display 304 of the user device 302 displays a testing system graphical user interface ("GUI") 310 provided by the testing system 100, which, in some embodiments, can be accessible by the user device 302. As shown in FIG. 3A, the testing system GUI 310 may display a default GUI 312 at an initiation of a marking process (e.g., the marking process described above in regard to FIG. 2). The default GUI 312 may be associated with an Enter Spec Props tab 315, and the default GUI 312 may further include a Run Check Pulse tab 316 for initiating a check pulse and a Marking Setup/Run tab 318 for initiating a marking pulse. The latter two tabs and associated GUIs are described in greater detail below in regard to FIGS. 3B and 3C. On the default GUI 312, a user may select a specimen 102 type and may input dimensions and material properties of the specimen 102. For instance, the default GUI 312 may include a plurality of selectable elements 314a-n for inputting a specimen 102 type, specimen 102 dimensions, and specimen 102 material properties.

Upon a selection of the Run Check Pulse tab 316, the testing system GUI 310 may display a check pulse initiation GUI 320 as shown in FIG. 3B. The check pulse initiation GUI 320 may include a plurality of selectable elements 322a-d for selecting a capacitor voltage, selecting a target crack tip region temperature, setting a trigger voltage, and setting a trigger wait time. Accordingly, a user may use the plurality of selectable elements 322a-d to adjust the capacitor voltage and the target crack tip region temperature. Upon inputting the capacitor voltage and the target crack tip region temperature, the testing system 100 may determine a necessary pulse width to achieve the target crack tip region temperature via any of the manners described above in regard to FIGS. 1A-2. Additionally, the user may use the plurality of selectable elements 322a-d to set a trigger voltage and set a trigger wait time. When the trigger voltage (e.g., ±10%) is applied (e.g., by a signal from the loading rig when the test is paused awaiting a marking cycle) for an interval equal to the trigger wait time or longer, the trigger is activated and the system is ready to fire a pulse.

Additionally, the check pulse initiation GUI 320 may include an adjust capacitor and fire check pulse selectable element 324. Selecting the adjust capacitor and fire check pulse selectable element 324 may cause the testing system 100 to charge or discharge the capacitor 112 to reach the selected capacitor voltage and to generate a single check pulse. Furthermore, selecting adjust capacitor and fire check pulse selectable element 324 may cause the testing system 100 to apply a first check pulse to the specimen 102 as described above in regard act 206 of FIG. 2. After applying the first check pulse, the testing system 100 may update an estimated crack tip region 114 temperature achieved during the pulse.

A user can run additional check pulses by selecting the adjust capacitor and fire check pulse selectable element 324 again. Additionally, the capacitor voltage and target crack tip region temperature can be adjusted between subsequent pulses as described above in regard to act 213 of FIG. 2A and via the plurality of selectable elements 322a-d. Additionally, by raising the target crack tip region temperature to a value near a melting point of the specimen 102, a damaging pulse can be applied to the specimen 102 to help initiate a crack 113 at the tip of a machined notch, as is described in greater detail below in regard to FIG. 4. The capacitor voltage and current achieved during each check pulse can be monitored by the testing system 100 and indicated within the check pulse initiation GUI 320 within one or more content windows 326a and 326b.

Additionally, the testing system 100 may monitor a temperature of a resistor utilized to discharge the capacitor 112 when lowering the capacitor voltage, which may affect an overall resistance of the circuit formed by the thermoelectric system and the specimen 102. Moreover, the check pulse initiation GUI 320 may indicate the temperature of the resistor as a dump temperature within a dump temperature GUI 328.

The check pulse initiation GUI 320 may further include the Enter Spec Props tab 315 and the Marking Setup/Run tab 318 described above. Selection of the Enter Spec Props tab 315 may cause the default GUI 312 described above in regard to FIG. 3A to be displayed within the testing system GUI 310. On the other hand, upon selection of the Marking Setup/Run tab 318, the testing system GUI 310 may display a marking pulse GUI 330, as shown in FIG. 3C. The marking pulse GUI 330 may include a plurality of selectable elements 332a-d for inputting an initial crack length, spacing between marks, and a number of marks. Additionally, via the plurality of selectable elements 332a-d, a user may select whether or not to mark an initial length of the crack within the specimen 102.

Furthermore, the marking pulse GUI 330 may indicate a calculated length of the crack 113 at the last mark and may indicate (e.g., indicate via an error message or icon (e.g., a red light)) whether a last-mark is out of range (a/W>1), which may prompt a user to adjust settings until all marks are within range. For instance, if a user specifies ten marks 1.0 mm apart, and the specimen is only 5 mm wide, the error message may prompt the user to adjust the settings to match the specimen size.

Furthermore, the testing system 100 may estimate mark widths for previously made marks and a present mark to be made and may indicate estimated mark widths within a content window 334. In some embodiments, the estimated mark widths may be indicated via a bar chart. In some embodiments, the estimated mark width of the present mark may be updated during a marking process.

Moreover, the marking pulse GUI 330 may include a begin marking sequence selectable element 336. Upon selection of the begin marking sequence selectable element 336, the testing system 100 may charge the capacitor 112 to a selected voltage, and the testing system 100 may begin applying sequences of marking pulses to the specimen 102. Additionally, the marking process may be tracked via one or more indicator elements 340a-e. Furthermore, the marking pulse GUI 330 may include one or more error/warning indicator elements 338a-h for providing diagnostic information to a user in the event of a testing system error or malfunction. In some embodiments, the error/warning indicator elements 338a-h may include a partial mark indicator element 338h that indicates that the growth test was not paused for long enough for a marking process to be completed.

Figure 4:
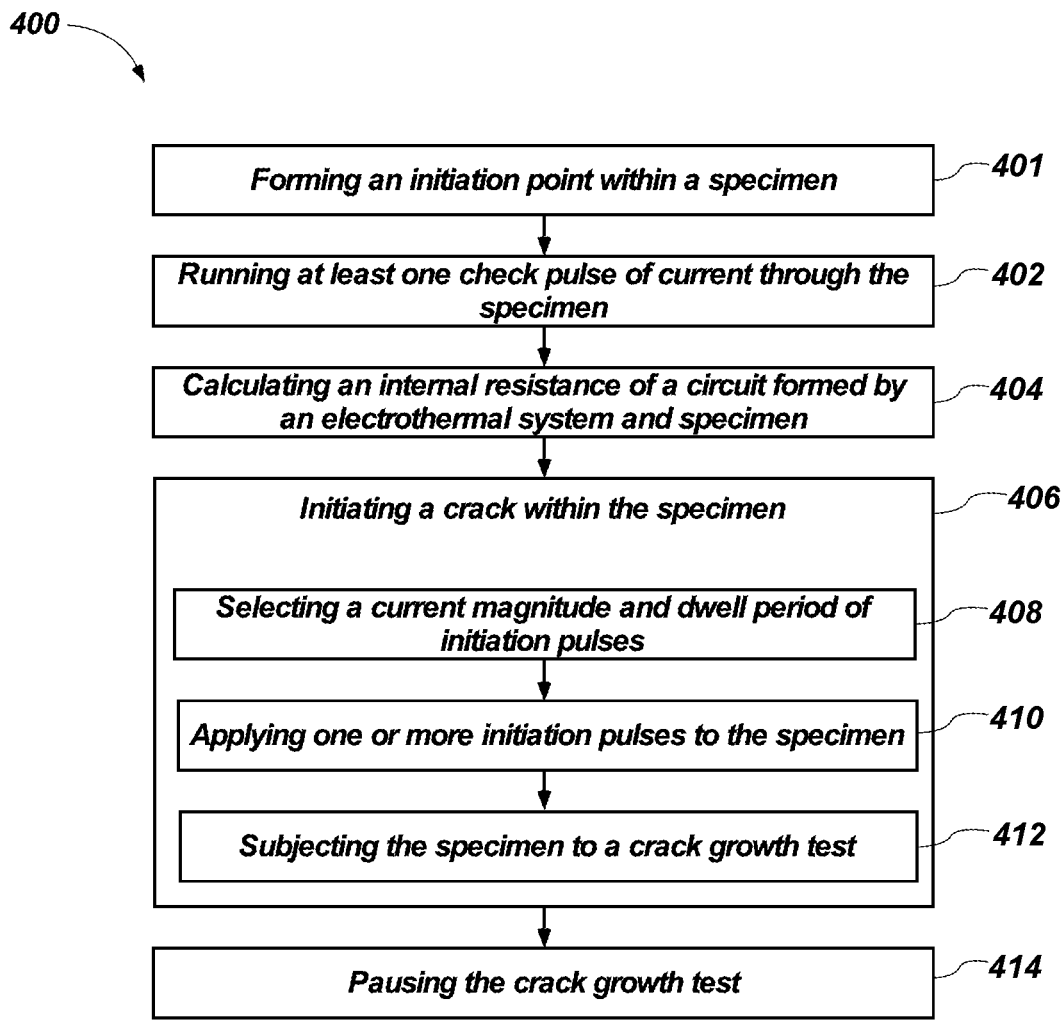
FIG. 4 is a flow chart of a method of initiating a crack within a specimen according to one or more embodiments of the present disclosure.

FIG. 4 shows an example process 400 for initiating crack growth (e.g., propagation) from a notch or crack 113 (FIG. 1A) formed within a specimen 102 utilizing electrothermal processes via a schematic-flow diagram. For instance, FIG. 4 shows one or more embodiments of a simplified sequence-flow that the testing system 100 (FIG. 1A) utilizes to weaken portions of the specimen 102 to facilitate crack growth within the specimen 102.

Referring to FIGS. 1A-4 together, in some embodiments, the process 400 may include forming an initiation point with the specimen 102, as shown in act 401. For example, the process 400 may include forming a notch or crack 113 (referred to herein collectively as a "notch") within the specimen 102 to cause current applied to the specimen 102 to generate a flux (i.e., a measure of flow of electric field) tangentially around a tip of the notch within the specimen 102 and within a region near the tip of the notch within the specimen 102, generate a flux concentration about the tip of the notch, generate heat within the region near the tip of the notch within the specimen 102, and cause a temperature of the specimen 102 to rise within the region near the tip of the notch.

In some embodiments, the process 400 may include applying at least one check pulse through the specimen 102, as shown in act 402 of FIG. 4. Additionally, in some embodiments, the at least one check pulse may be applied at a voltage and pulse width (typically, a relatively short pulse width) selected to cause physical damage to (e.g., weaken a physical structure of) the specimen 102. For instance, the voltage and pulse width of the at least one check pulse may be determined (e.g., selected) based on a rated internal resistance of electrothermal system 103, which may be known. In some embodiments, the at least one check pulse may be specified to a temperature below the target activation temperature. As a non-limiting example, applying at least one check pulse through the specimen 102 may include any of the actions described above in regard to act 206 of FIG. 2.

The process 400 may further include calculating an internal resistance (R=V/I) of a circuit formed by the electrothermal system 103 and the specimen 102 (e.g., a resistance of the specimen 102), as shown in act 404 of FIG. 4. For example, the process 400 may include calculating an internal resistance (R=V/I) of a circuit formed by the electrothermal system 103 and the specimen 102 via any of the manners described above in regard to act 208 of FIG. 2.

Upon determining the internal resistance of the circuit formed by the electrothermal system 103 and the specimen 102, the process 400 may include initiating a crack 113 within the specimen 102, as shown in act 406 of FIG. 4. In some embodiments, initiating a crack 113 within the specimen 102 may include selecting a current (I) magnitude of subsequent initiation pulses of current (referred to hereinafter as "initiation pulses) and dwell times ($\Delta t_{pulse}$) of the initiation pulses to cause a portion of the specimen 102 to achieve (e.g., reach) a target activation temperature (e.g., a crack initiation target temperature ($T_{init}$)) during each initiation pulse, as shown in act 408 of FIG. 4. As used herein, $T_{init}$ may refer to a target crack tip temperature (° C.) for crack initiation.

Additionally, in some embodiments, initiating a crack 113 within the specimen 102 may include applying one or more initiation pulses to the specimen 102, as shown in act 410 of FIG. 4. As noted above, in some embodiments, the one or more initiation pulses may be of a known $K_E$ based on the known internal resistance of the circuit formed by the electrothermal system 103 and the specimen 102. Furthermore, the one or more initiation pulses may be applied to the specimen 102 via any of the manners described above in regard to FIG. 1A and act 214 of FIG. 2. As noted above, applying the one or more initiation pulses to the specimen 102 may generate a flux (i.e., a measure of flow of electric field) tangentially around a tip of the notch within the specimen 102 and within a region near the tip of the notch within the specimen 102, generate a flux concentration about the tip of the notch, generate heat within the region near the tip of the notch within the specimen 102, and cause a temperature of the specimen 102 to rise within the region near the tip of the notch.

In some embodiments, the one or more initiation pulses may include a sequence of distinct initiating pulses. For instance, the one or more initiation pulses may include three, five, ten, fifty, one hundred, or more sequential initiation pulses. Additionally, each initiation pulse of the sequence of initiation pulses may have a dwell time ($\Delta t_{pulse}$) calculated to bring the region near the tip of the notch within the specimen 102 to the crack initiation target temperature Tint momentarily via any of the methods described above in regard to act 214 of FIG. 2. Causing the region near the tip of the notch within the specimen 102 to achieve the crack initiation target temperature $T_{init}$ may weaken a physical structure of the region near the tip of the notch and may facilitate crack propagation through the region near the tip of the notch.

Upon applying the one or more initiation pulses to the specimen 102, the process 400 may include subjecting the specimen 102 to a crack growth test, as shown in act 412 of FIG. 4. The crack growth test may include any of the methods described above in regard to FIG. 1A and act 202 of FIG. 2. For example, the process 400 may include applying one or more loads to the specimen 102 via the load application system 104. Additionally, subjecting the specimen 102 to crack growth test may include any of the actions described in act 202 of FIG. 2.

In some embodiments, the crack growth test may involve a fatigue crack extension represented by:

$$(10)\ \Delta a_{ext} = 6\pi K_T K_E (T_{init} - T_{tint})/K_E^2 \qquad (6)$$

Subjecting the specimen 102 to the crack growth test after applying one or more initiation pulses to the specimen 102 may cause a crack 113 to develop within the specimen 102 and to propagate through at least a portion of the region near the tip of the notch within the specimen 102. Additionally, applying one or more initiation pulses to the specimen 102 may enable crack initiation at a lower stress intensity during a crack growth test in comparison to crack growth tests not applying one or more initiation pulses to the specimen 102. Additionally, initiating a crack 113 within a specimen 102 according to the embodiments described herein may be applicable for a variety of materials, including materials that do not heat tint. Moreover, because applying one or more initiation pulses to the specimen 102 may enable crack initiation at a lower stress intensity during a crack growth test, the process 400 described herein may be advantageous over conventional methods of causing cracks within specimens because crack growth tests involving high initial stress intensities often give rise to artifact. The foregoing, process 400 is applicable to crack growth threshold testing (e.g., part of ASTM E 647) and reducing a need for load shedding.

In some embodiments, the process 400 may include pausing the crack growth test, as shown in act 414 of FIG. 4. In some embodiments, pausing the conventional crack growth test may include removing and/or maintaining any load applied to the specimen 102 with the load application system 104 via any of the manners described in regard to act 204 of FIG. 2.

Additionally, the process 400 may optionally include repeating acts 402-412 of FIG. 4 until a crack growth test is complete. Moreover, the process 400 may be combined with any of the acts described in regard to FIG. 2 to enable the crack 113 to be marked during crack propagation through the specimen 102.

Figure 5:
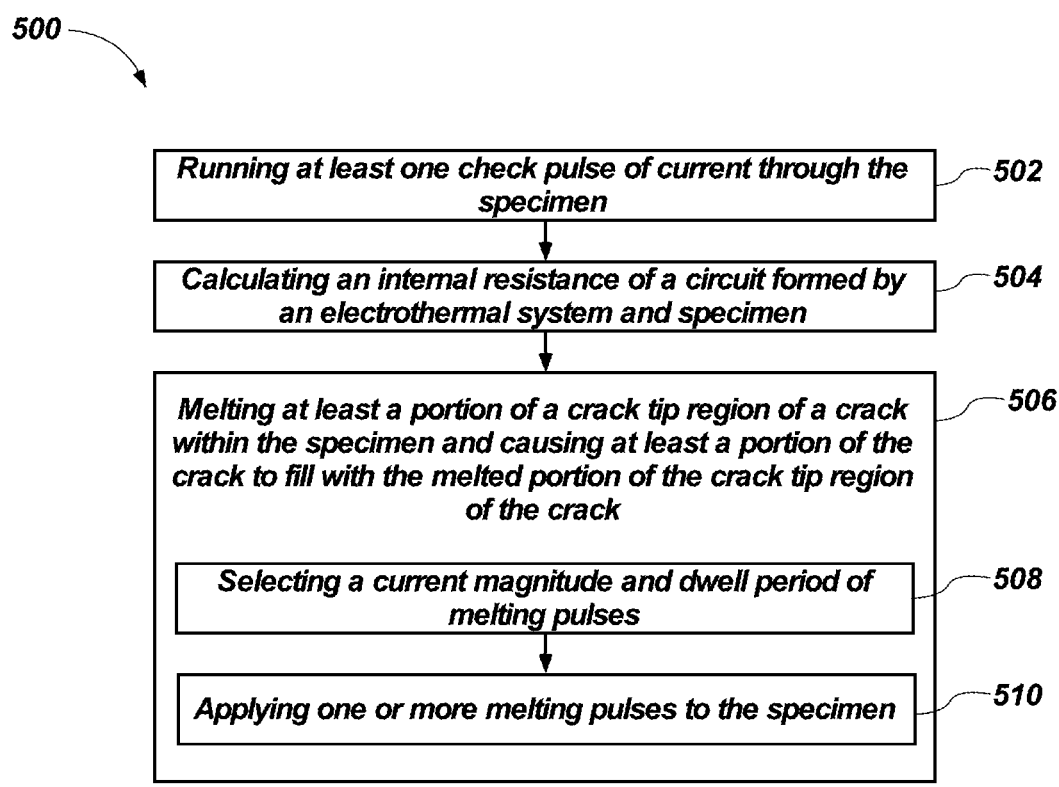
FIG. 5 is a flow chart of a method of melting a crack tip region of a crack and at least partially welding the crack together according to one or more embodiments of the present disclosure.

FIG. 5 shows an example process 500 for melting the crack tip region 114 (FIG. 1A) of a crack 113 within a specimen 102 and at least partially filling the crack 113 within the specimen 102 utilizing electrothermal processes via a schematic-flow diagram. For instance, FIG. 5 shows one or more embodiments of a simplified sequence-flow that the testing system 100 (FIG. 1A) utilizes to melt portions of the specimen 102 to facilitate filling the crack 113 within the specimen 102.

Referring to FIGS. 1A and/or 1B and 5 together, in some embodiments, the process 500 may include applying at least one check pulse through the specimen 102, as shown in act 502 of FIG. 5. Additionally, in some embodiments, the at least one check pulse may applied at a voltage and pulse width (typically, a relatively short pulse width) selected to avoid any physical damage to the specimen 102. For instance, the voltage and pulse width of the at least one check pulse may be determined (e.g., selected) based on a rated internal resistance of electrothermal system 103, which may be known. As a non-limiting example, applying at least one check pulse through the specimen 102 may include any of the actions described above in regard to act 206 of FIG. 2.

The process 500 may further include calculating an internal resistance (R=V/I) of a circuit formed by the electrothermal system 103 and the specimen 102 (e.g., a resistance of the specimen 102), as shown in act 504 of FIG. 5. For example, the process 500 may include calculating an internal resistance (R=V/I) of a circuit formed by the electrothermal system 103 and the specimen 102 via any of the manners described above in regard to act 208 of FIG. 2.

Upon determining the internal resistance of the circuit formed by the electrothermal system 103 and the specimen 102, the process 500 may include melting at least a portion of the crack tip region 114 a crack 113 within the specimen 102 and causing at least a portion of the crack 113 to fill with the melted portion of the crack tip region 114 of the crack 113, as shown in act 506 of FIG. 5. In some embodiments, melting at least a portion of the crack tip region 114 a crack 113 within the specimen 102 may include selecting a current (I) magnitude of subsequent melting pulses of current (referred to hereinafter as "melting pulses) and dwell times ($\Delta t_{pulse}$) of the melting pulses to cause a portion of the specimen 102 to achieve (e.g., reach) a target activation temperature (e.g., a melting target temperature ($T_{melt}$)) during each melting pulse, as shown in act 508 of FIG. 5. As used herein, $T_{melt}$ may refer to a target crack tip temperature (° C.) for melting the specimen 102 (e.g., a temperature matching or exceeding a melting point of the specimen 102).

Additionally, in some embodiments, melting at least a portion of the crack tip region 114 and causing at least a portion of the crack 113 to fill with the melted portion of the crack tip region 114 of the crack 113 may include applying one or more melting pulses to the specimen 102, as shown in act 510 of FIG. 5. As noted above, in some embodiments, the one or more melting pulses may be of a known $K_E$ based on the known internal resistance of the circuit formed by the electrothermal system 103 and the specimen 102. Furthermore, the one or more melting pulses may be applied to the specimen 102 via any of the manners described above in regard to FIG. 1A, act 214 of FIG. 2, and act 410 of FIG. 4. As noted above, applying the one or more melting pulses to the specimen 102 may generate a flux (i.e., a measure of flow of electric field) tangentially around a crack tip 111 and within crack tip region 114, generate a flux concentration about the crack tip region 114 of the crack 113, generate heat within the crack tip region 114, and cause a temperature of the specimen 102 to rise within the crack tip region 114 of the crack 113.

In some embodiments, the one or more melting pulses may include a sequence of distinct melting pulses. For instance, the one or more melting pulses may include three, five, ten, fifty, one hundred, or more sequential melting pulses. Additionally, each melting pulse of the sequence of melting pulses may have a dwell time ($\Delta t_{pulse}$) calculated to bring the crack tip region 114 to the melting target temperature $T_{melt}$ momentarily via any of the methods described above in regard to act 214 of FIG. 2. Causing the crack tip region 114 to achieve the melting target temperature $T_{melt}$ may cause the crack tip region 114 of the crack 113 to at least partially melt and to be drawn in a capillary manner along at least a portion of the length of the crack 113 thus filling a portion of the crack 113. In other words, molten material may be drawn up the crack 113 and may weld together at least a portion of the crack 113. For instance, causing the crack tip region 114 to achieve an activation temperature at or above a melting temperature may create molten material at the crack tip 111 that fuses opposing faces of the crack 113 and may cause the crack 113 to decrease in size and length. Furthermore, the newly joined portions of the previous crack 113 may define a new crack tip that becomes a new point of maximum heat generation.

Additionally, the process 500 may optionally include repeating acts 502-510 of FIG. 5 until the crack 113 is filled to a predetermined amount (e.g., completely filled). The foregoing method may be useful as a welding crack-repair technique while enabling a much narrower melt zone and heat-affected zone in comparison to conventional welding methods, or may be used to join two adjacent portion (e.g., pieces of the specimen 102) forming a crack interface as shown in FIG. 1B.

Figure 6:
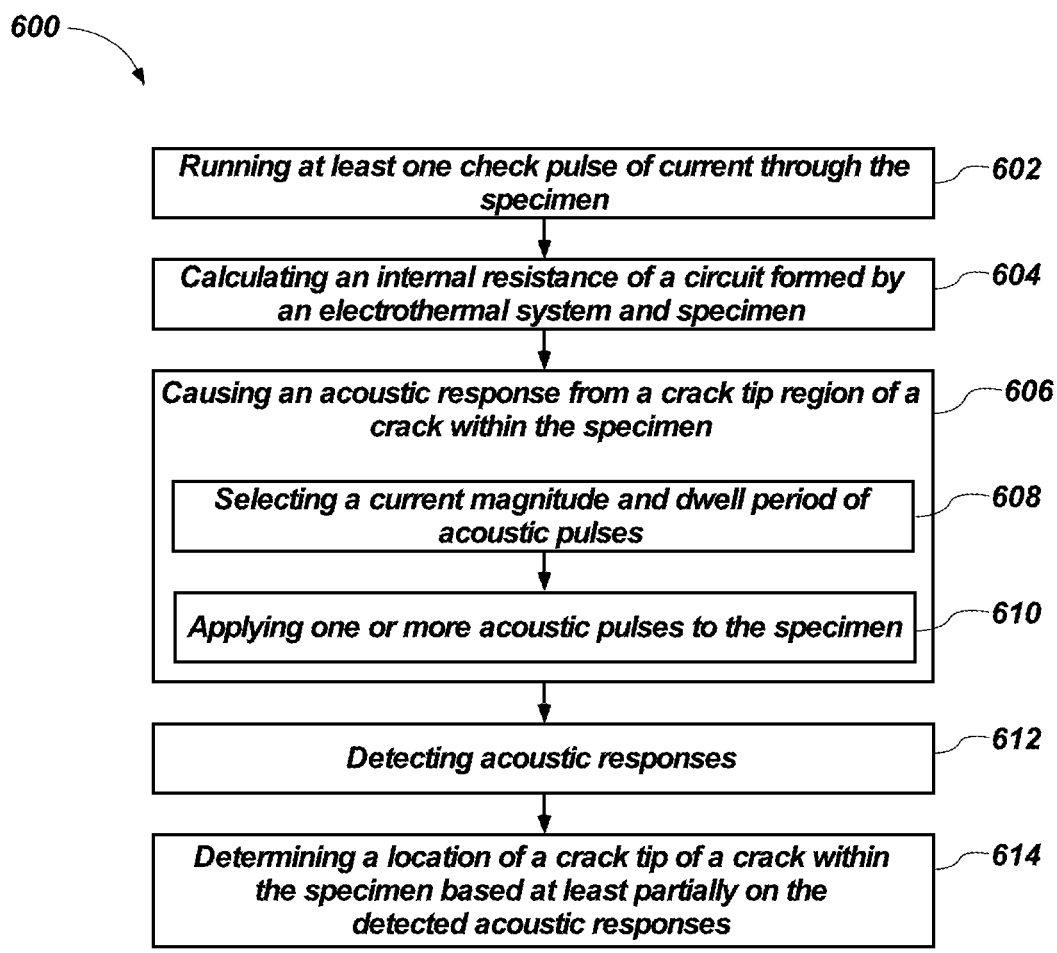
FIG. 6 is a flow chart of a method of inducing an acoustic response from crack tip region of a crack according to one or more embodiments of the present disclosure.

FIG. 6 shows an example process 600 for thermally influencing a crack tip region 114 (FIG. 1A) of a crack 113 within the specimen 102 and causing a detectable acoustic response utilizing electrothermal processes via a schematic-flow diagram. For instance, FIG. 6 shows one or more embodiments of a simplified sequence-flow that the testing system 100 (FIG. 1A) utilizes to thermally influence a crack tip region 114 and causing an acoustic response.

Referring to FIGS. 1A and 6 together, in some embodiments, the process 600 may include applying at least one check pulse of current (referred to hereinafter as "at least one check pulse) through the specimen 102, as shown in act 602 of FIG. 6. Additionally, in some embodiments, the at least one check pulse may be applied at a voltage and pulse width (typically, a relatively short pulse width) selected to avoid any physical damage to the specimen 102. For instance, the voltage and pulse width of the at least one check pulse may be determined (e.g., selected) based on a rated internal resistance of electrothermal system 103, which may be known. As a non-limiting example, applying at least one check pulse through the specimen 102 may include any of the actions described above in regard to act 206 of FIG. 2.

The process 600 may further include calculating an internal resistance (R=V/I) of a circuit formed by the electrothermal system 103 and the specimen 102 (e.g., a resistance of the specimen 102), as shown in act 604 of FIG. 6. For example, the process 600 may include calculating an internal resistance (R=V/I) of a circuit formed by the electrothermal system 103 and the specimen 102 via any of the manners described above in regard to act 208 of FIG. 2.

Upon determining the internal resistance of the circuit formed by the electrothermal system 103 and the specimen 102, the process 600 may include causing an acoustic response from a crack tip region 114, as shown in act 606 of FIG. 6. In some embodiments, causing an acoustic response from a crack tip region 114 may include selecting a current (I) magnitude of subsequent acoustic causing pulses of current (referred to hereinafter as "acoustic pulses) and dwell times ($\Delta t_{pulse}$) of the acoustic pulses to cause a portion of the specimen 102 to achieve (e.g., reach) a target activation temperature (e.g., an acoustic target temperature ($T_{acoustic}$)) during each acoustic pulse, as shown in act 608 of FIG. 6. As used herein, $T_{acoustic}$ may refer to a target crack tip 111 temperature (° C.) for causing an acoustic response from a crack tip region 114.

Additionally, in some embodiments, causing an acoustic response from a crack tip region 114 may include applying one or more acoustic pulses to the specimen 102, as shown in act 610 of FIG. 6. As noted above, in some embodiments, the one or more acoustic pulses may be of a known $K_E$ based on the known internal resistance of the circuit formed by the electrothermal system 103 and the specimen 102. Furthermore, the one or more acoustic pulses may be applied to the specimen 102 via any of the manners described above in regard to FIG. 1A, act 214 of FIG. 2, act 410 of FIG. 4, and act 510 of FIG. 5. As noted above, applying the one or more acoustic pulses to the specimen 102 may generate a flux (i.e., a measure of flow of electric field) tangentially around a tip of the crack 113 within the specimen 102 and within crack tip region 114, generate a flux concentration about the crack tip region 114 of the crack 113, generate heat within the crack tip region 114, and cause a temperature of the specimen 102 to rise within the crack tip region 114 of the crack 113. Furthermore, applying the one or more acoustic pulses to the specimen 102 may induce Lorentz forces (e.g., combinations of electric and magnetic forces on a point charge due to electromagnetic fields) within the crack tip region 114. Moreover, the induced Lorentz forces may augment an acoustic signal caused by the temperature rise of the crack tip region 114.

In some embodiments, the one or more acoustic pulses may include a sequence of distinct acoustic pulses. For instance, the one or more acoustic pulses may include three, five, ten, fifty, one hundred, or more sequential acoustic pulses. Additionally, each acoustic pulse of the sequence of acoustic pulses may have a dwell time ($\Delta t_{pulse}$) calculated to bring the crack tip region 114 to the acoustic target temperature $T_{acoustic}$ momentarily via any of the methods described above in regard to act 214 of FIG. 2. Causing the crack tip region 114 to achieve the acoustic target temperature $T_{acoustic}$ may cause the crack tip region 114 of the crack 113 to emit a detectable acoustic signal and may induce Lorentz forces within the crack tip region 114.

In some embodiments, the process 600 may include detecting one or more acoustic responses, as shown in act 612 of FIG. 6. For instance, the acoustic signal may be detected via conventional sensors (e.g., sensors 126 (FIG. 1A). For example, the acoustic signal may be detected via a microphone, an ultrasonic sensor, an acoustic wave sensor, etc. Additionally, in some embodiments, the process 600 may include determining a location of a crack tip 111 within the specimen 102 based at least partially on the detected one or more acoustic responses, as shown in act 614 of FIG. 6. For instance, multiple sensors may be disposed at different locations on the specimen 102, and conventional triangulation methods may be utilized to determine locations of the crack 113 and/or crack tip 111.

Additionally, the process 600 may optionally be combined with any of the acts described in regard to FIG. 2 to enable determination of locations of a crack tip 111 during a crack growth test.

Figure 7:
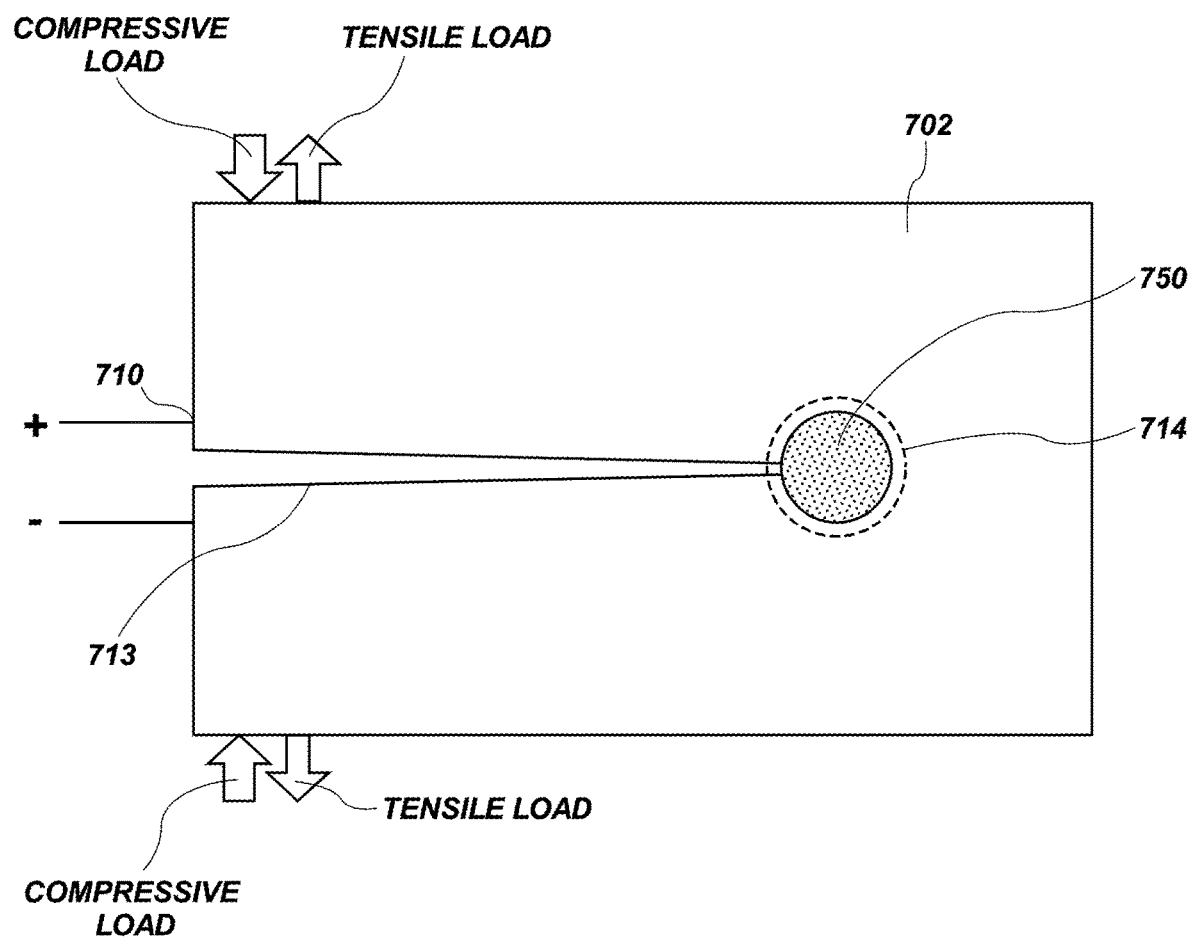
FIG. 7 is a schematic representation of a specimen with a removable region according to one or more embodiments of the present disclosure.

FIG. 7 is a schematic representation of a specimen 702 with a removable region 750 (e.g., a filament) disposed within the specimen 702 at a crack tip region 714 of a crack 713. In some embodiments, the removable region 750 may be disposed within the crack tip region 714 of the specimen during a tensile load, and the removable region 750 may be subjected to compressive loads during a thermo-mechanical process. Having the thermally or thermo-mechanically influenced region be removable permits further physical examination or other use of the thermally or thermal mechanically processed material. Furthermore, the removable region 750 may be configured to be of different materials than the remainder of the specimen 702 and may also be of a non-electrically conductive material. For example, a cylindrical carbon filament coated with nickel as a catalyst may be inserted in a cylindrical cavity at the crack tip region 714 and may be subjected to heat and compression to study the formation of diamond, or to produce diamond filament. In some embodiments, the specimen 702 may be subjected to one or more of compressive and tensile loads during a thermo-mechanical process. Additionally, embodiments of the present disclosure include subjecting the specimen 702 with the removable region 750 to any of the processes described above in regard to FIGS. 1-6.

Additional non-limiting example embodiments of the disclosure are described below.

Embodiment 1: A testing system for causing a physical change in a crack tip region of a crack within a specimen, the testing system comprising: a load application system for applying a load to the specimen having the crack formed therein, the load application system configured to perform a crack growth test on the specimen; an electrothermal system for applying an electrical current through the specimen and comprising a power supply; and a controller operably coupled to the load application system and the electrothermal system.

Embodiment 2: The testing system of embodiment 1, wherein the electrothermal system further comprises a plurality of electrical connections electrically connecting the power supply to the specimen and for applying the electrical current through the specimen.

Embodiment 3: The testing system of embodiment 2, wherein at least one of the plurality of electrical connections is connected to the specimen.

Embodiment 4: The testing system of embodiment 1, wherein the specimen comprises two separate portions, and wherein an interface between the two separate portions is at least partially coated with an insulative material.

Embodiment 5: The testing system of embodiment 1, wherein the electrothermal system is configured to apply the electrical current through the specimen via one or more of an electric spark or induction.

Embodiment 6: The testing system of embodiment 1, wherein the electrothermal system is configured to generate flux tangentially around the crack tip region of the crack within the specimen, generate a flux concentration about the crack tip region of the crack, generate heat at the crack tip region of the crack, and cause a temperature rise within the crack tip region of the crack.

Embodiment 7: The testing system of embodiment 1, wherein the electrothermal system is configured to cause the crack tip region of the crack within the specimen to reach a predetermined activation temperature that causes the physical change within the crack tip region.

Embodiment 8: The testing system of embodiment 7, wherein the physical change comprises a detectable chemical reaction at the crack tip region.

Embodiment 9: The testing system of embodiment 7, wherein the physical change comprises a weakening of a physical structure of the crack tip region.

Embodiment 10: The testing system of embodiment 7, wherein the physical change comprises an extension of a length of the crack and a change of location of the crack tip region within the specimen.

Embodiment 11: The testing system of embodiment 7, wherein the physical change comprises melting at least some of the crack tip region, decreasing a length of the crack, and changing a location of the crack tip region within the specimen.

Embodiment 12: The testing system of embodiment 1, wherein the electrothermal system is configured to cause the crack tip region of the crack within the specimen to reach a predetermined activation temperature that causes a detectable acoustic signal.

Embodiment 13: A method of thermally influencing a crack tip region of a crack within a specimen, the method comprising: applying at least one pulse of current to the specimen to generate flux tangentially around the crack within the specimen and at the crack tip region; and causing the crack tip region of the crack within the specimen to reach a predetermined activation temperature.

Embodiment 14: The method of embodiment 13, further comprising not substantially raising a temperature of a remainder of the specimen.

Embodiment 15: The method of embodiment 13, wherein applying at least one pulse of current comprises applying a sequence of distinct pulses to the specimen.

Embodiment 16: The method of embodiment 13, further comprising introducing an environment at the crack tip region of the crack that is reactive with a material of the specimen.

Embodiment 17: The method of embodiment 13, further comprising: detecting a length of the crack; and based at least partially on the length of the crack, adjusting a magnitude of the at least one pulse of current.

Embodiment 18: The method of embodiment 13, wherein causing the crack tip region of the crack to reach a predetermined activation temperature comprises cause the crack tip region to tint relative to a remainder of the specimen.

Embodiment 19: The method of embodiment 13, wherein causing the crack tip region of the crack to reach a predetermined activation temperature comprises weakening a physical structure of the crack tip region to facilitate crack growth within the crack tip region.

Embodiment 20: The method of embodiment 13, wherein causing the crack tip region of the crack to reach a predetermined activation temperature comprises causing a detectable acoustic response from the crack tip region of the crack within the specimen.

Embodiment 21: A method of thermally influencing a crack tip region of a crack within a specimen, the method comprising: subjecting the specimen to one or more loads within a portion of a crack growth test; pausing the crack growth test; applying at least one pulse of current to the specimen to generate flux tangentially around the crack within the specimen and at the crack tip region; causing the crack tip region of the crack within the specimen to reach a predetermined activation temperature; and subjecting the specimen to one or more additional loads within another portion of the crack growth test.

Embodiment 22: The method of embodiment 21, further comprising detecting a length of the crack and selecting a magnitude and/or duration of a current of the at least one pulse of current based at least partially on the length of the crack.

Embodiment 23: The method of embodiment 21, further comprising: pausing the crack growth test again; applying at least one additional pulse of current to the specimen to generate flux tangentially around the crack within the specimen and at the crack tip region; and causing the crack tip region of the crack within the specimen to reach the predetermined activation temperature.

Embodiment 24: The method of embodiment 21, wherein the crack tip region of the crack is removable from the specimen, and wherein the method further comprises removing the crack tip region from the specimen.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as claimed, including legal equivalents thereof. In addition, features from one embodiment may be combined with features of another embodiment while still being encompassed within the scope of the invention as contemplated by the inventors. Further, embodiments of the disclosure have utility with different and various test methods and systems.

What is claimed is:

1. A testing system for causing a physical change in a crack tip region of a crack within a specimen, the testing system comprising:
    a load application system for applying a load to the specimen having the crack formed therein, the load application system configured to perform a crack growth test on the specimen;
    an electrothermal system for applying an electrical current through the specimen; and
    a controller operably coupled to the load application system and the electrothermal system.

2. The testing system of claim 1, wherein the electrothermal system further comprises a plurality of electrical connections configured to electrically connect the electrothermal system to the specimen and apply the electrical current through the specimen.

3. The testing system of claim 2, wherein at least one of the plurality of electrical connections is configured to connect to the specimen.

4. The testing system of claim 1, wherein the specimen comprises two separate portions, and wherein an interface between the two separate portions is at least partially coated with an insulative material.

5. The testing system of claim 1, wherein the electrothermal system is configured to apply the electrical current through the specimen via one or more of an electric spark or induction.

6. The testing system of claim 1, wherein the electrothermal system is configured to generate flux tangentially around the crack tip region of the crack within the specimen, generate a flux concentration about the crack tip region of the crack, generate heat at the crack tip region of the crack, and cause a temperature rise within the crack tip region of the crack.

7. The testing system of claim 1, wherein the electrothermal system is configured to cause the crack tip region of the crack within the specimen to reach an activation temperature that causes the physical change within the crack tip region.

8. The testing system of claim 7, wherein the physical change comprises a chemical reaction at the crack tip region.

9. The testing system of claim 7, wherein the physical change comprises a weakening of a physical structure of the crack tip region.

10. The testing system of claim 7, wherein the physical change comprises an extension of a length of the crack and a change of location of the crack tip region within the specimen.

11. The testing system of claim 7, wherein the physical change comprises melting at least some of the crack tip region, decreasing a length of the crack, and changing a location of the crack tip region within the specimen.

12. The testing system of claim 1, wherein the electrothermal system is configured to cause the crack tip region of the crack within the specimen to reach an activation temperature that causes an acoustic signal.

13. A method of thermally influencing a crack tip region of a crack within a specimen, the method comprising:
    applying at least one pulse of current to the specimen to generate flux tangentially around the crack within the specimen and at the crack tip region; and
    causing the crack tip region of the crack within the specimen to reach a predetermined activation temperature.

14. The method of claim 13, wherein applying at least one pulse of current to the specimen comprises causing the crack tip region of the crack within the specimen to reach a predetermined activation temperature without substantially raising a temperature of a portion of the specimen.

15. The method of claim 13, wherein applying at least one pulse of current comprises applying a sequence of distinct pulses of current to the specimen.

16. The method of claim 13, further comprising introducing an environment at the crack tip region of the crack that is reactive with a material of the specimen.

17. The method of claim 13, further comprising:
    detecting a length of the crack; and
    based at least partially on the length of the crack, adjusting a magnitude of the at least one pulse of current.

18. The method of claim 13, wherein causing the crack tip region of the crack to reach an activation temperature comprises cause the crack tip region to tint relative to a portion of the specimen remote to the crack tip region.

19. The method of claim 13, wherein causing the crack tip region of the crack to reach an activation temperature comprises weakening a physical structure of the crack tip region to facilitate crack growth within the crack tip region.

20. The method of claim 13, wherein causing the crack tip region of the crack to reach an activation temperature comprises causing a detectable acoustic response from the crack tip region of the crack within the specimen.

21. A method of thermally influencing a crack tip region of a crack within a specimen, the method comprising:
    subjecting the specimen to at least one load during a crack growth test;
    maintaining the at least one load;
    applying at least one pulse of current to the specimen to generate flux tangentially around the crack within the specimen and at the crack tip region;
    causing the crack tip region of the crack within the specimen to reach a predetermined activation temperature; and
    subjecting the specimen to at least one additional load.

22. The method of claim 21, further comprising detecting a length of the crack and selecting a magnitude of a current of the at least one pulse of current based at least partially on the length of the crack.

23. The method of claim 21, further comprising:
   maintaining the at least one additional load;
   applying at least one additional pulse of current to the specimen to generate flux tangentially around the crack within the specimen and at the crack tip region; and
   causing the crack tip region of the crack within the specimen to reach the predetermined activation temperature.

24. The method of claim 21, wherein the crack tip region of the crack is removable from the specimen, and wherein the method further comprises removing the crack tip region from the specimen.

* * * * *

UNITED STATES PATENT AND TRADEMARK OFFICE
CERTIFICATE OF CORRECTION

PATENT NO. : 11,002,698 B2
APPLICATION NO. : 16/157859
DATED : May 11, 2021
INVENTOR(S) : Richard Pettit Page 1 of 1

It is certified that error appears in the above-identified patent and that said Letters Patent is hereby corrected as shown below:

In the Specification

| | | |
|---|---|---|
| Column 14, | Line 20, | change "$K_T$" to --$\kappa_T$-- |
| Column 14, | Line 21, | change "$K_E$" to --$\kappa_E$-- |
| Column 15, | Line 59, | change "$2\pi K_T K_E$" to --$2\pi\kappa_T\kappa_E$-- |
| Column 16, | Line 18, | change "$K_I \geq 2-K_{I\;ETE}$" to --$K_I \geq -K_{I\;ETE}$-- |
| Column 21, | Line 16, | change "Tint" to --$T_{init}$-- |
| Column 21, | Line 37, | change "$6\pi K_T K_E$" to --$6\pi\kappa_T\kappa_E$-- and change "(6)" on right-hand margin to --(10)-- |

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*